No. 874,908.       PATENTED DEC. 24, 1907.
C. E. FRITTS, DEC'D.
J. H. FRITTS, ADMINISTRATRIX.
APPARATUS OR MEANS FOR THE PRODUCTION, TRANSMISSION, AND DISTRIBUTION OF ELECTRIC CURRENTS.
APPLICATION FILED NOV. 23, 1886.
3 SHEETS—SHEET 1.
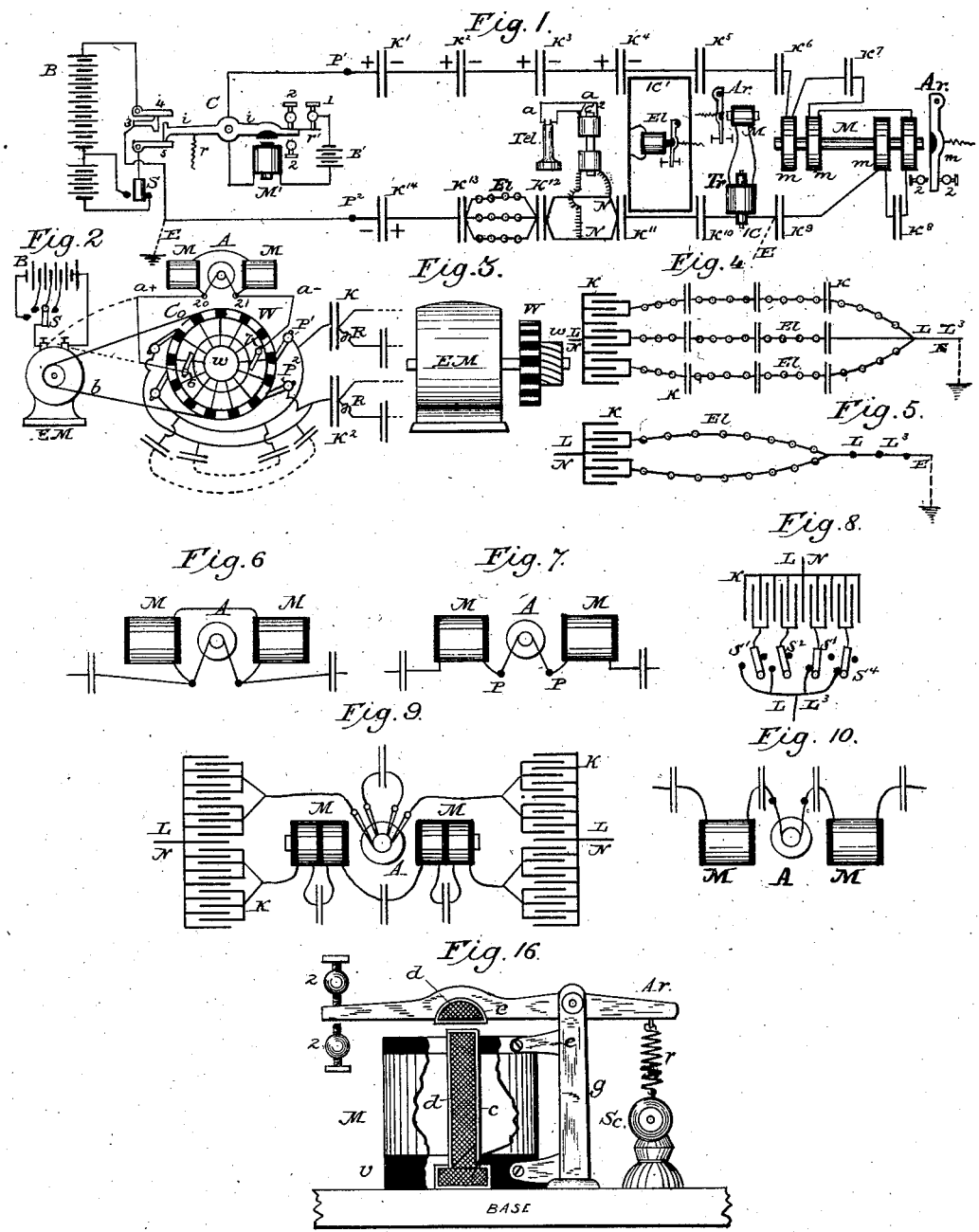
WITNESSES
INVENTOR
Charles E. Fritts No. 874,908.　　　　　　　　　　　　　　　　　　　　　PATENTED DEC. 24, 1907.
C. E. FRITTS, DEC'D.
J. H. FRITTS, ADMINISTRATRIX.
APPARATUS OR MEANS FOR THE PRODUCTION, TRANSMISSION, AND DISTRIBUTION OF ELECTRIC CURRENTS.
APPLICATION FILED NOV. 23, 1886.
3 SHEETS—SHEET 2.
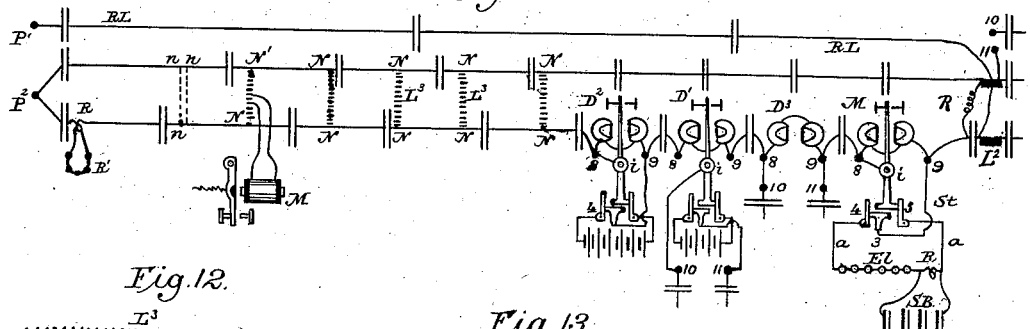
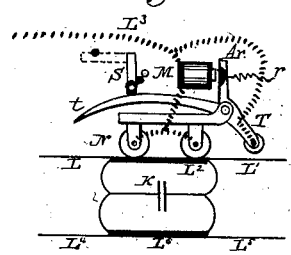
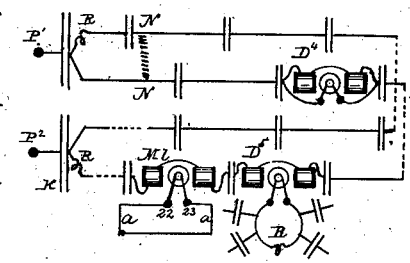
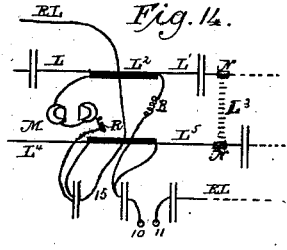
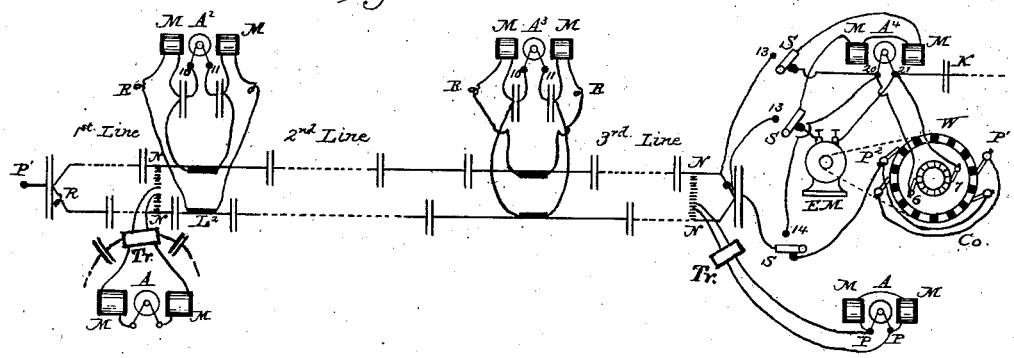
WITNESSES
T. B. Farnsworth
D. L. Holbrook
INVENTOR
Charles E. Fritts No. 874,908. PATENTED DEC. 24, 1907.
C. E. FRITTS, DEC'D.
J. H. FRITTS, ADMINISTRATRIX.
APPARATUS OR MEANS FOR THE PRODUCTION, TRANSMISSION, AND DISTRIBUTION OF ELECTRIC CURRENTS.
APPLICATION FILED NOV. 23, 1886.
3 SHEETS—SHEET 3.
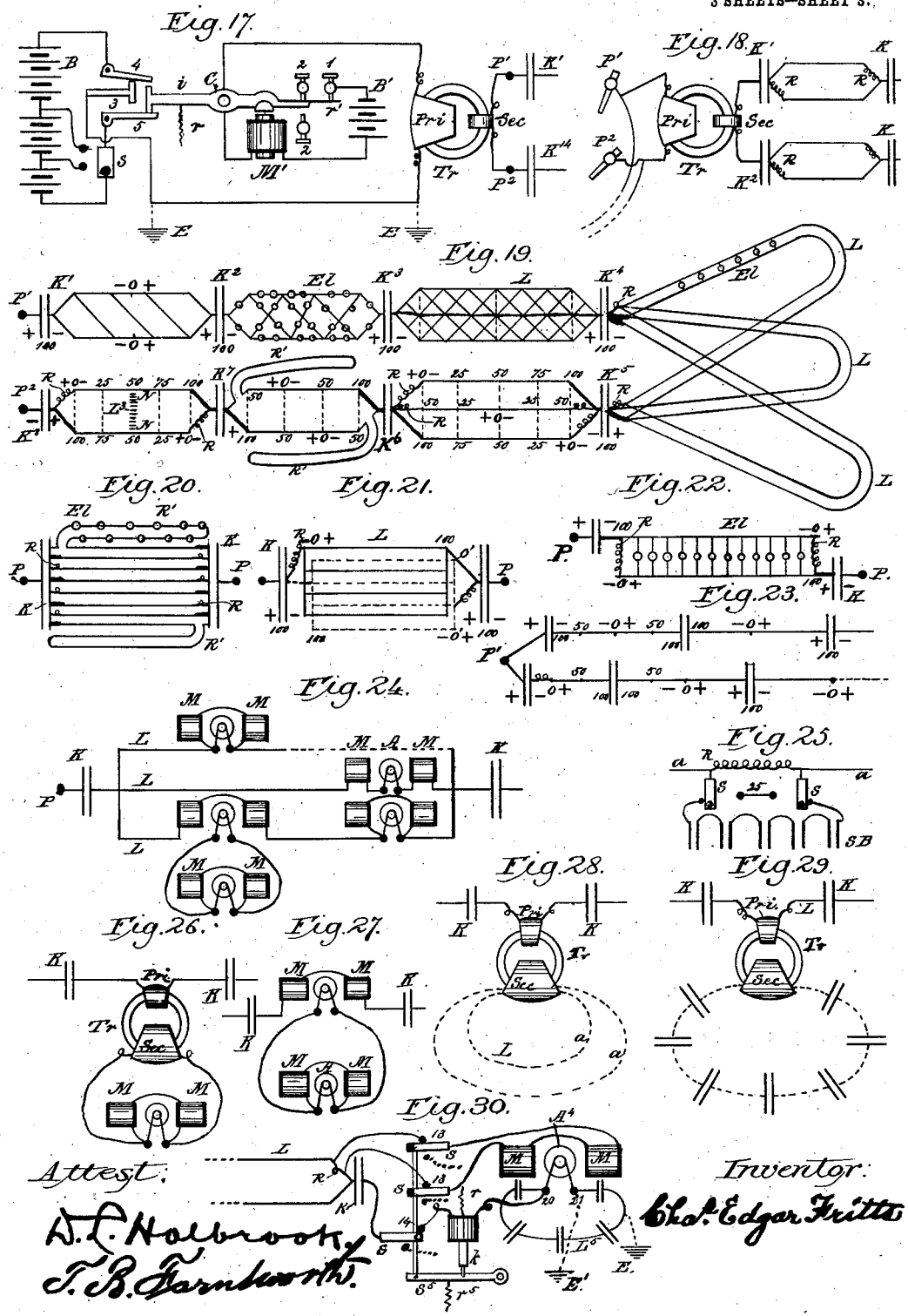

UNITED STATES PATENT OFFICE.

CHARLES E. FRITTS, OF NEW YORK, N. Y., JOSEPHINE H. FRITTS, ADMINISTRATRIX OF SAID CHARLES E. FRITTS, DECEASED, ASSIGNOR OF ONE-THIRD TO SPENCER B. PRENTISS, OF WASHINGTON, DISTRICT OF COLUMBIA.

APPARATUS OR MEANS FOR THE PRODUCTION, TRANSMISSION, AND DISTRIBUTION OF ELECTRIC CURRENTS.

No. 874,908.   Specification of Letters Patent.   Patented Dec. 24, 1907.

Application filed November 23, 1886. Serial No. 278,855.

*To all whom it may concern:*

Be it known that I, CHARLES EDGAR FRITTS, a citizen of the United States, residing at New York, in the county and State of New York, have invented certain new and useful Improvements in Apparatus or Means for the Production, Transmission, and Distribution of Electric Currents, of which the following is a specification.

My present invention consists in employing a generator or source of normally straight or unipolar electric current, electromotive force, or electric potential, in any form; by any suitable means varying the polarity, strength, electromotive force or potential thereof; therewith charging condensers and transmitting corresponding electrical currents or impulses over one or more sectional lines substantially as described in my Patent No. 383,520, granted May 29, 1888; and utilizing said currents by electrical receivers, including such as are, or ordinarily can be, used only for straight currents, but which my system enables to be actuated by alternating currents without first straightening or "adjusting" the same.

It also consists in various minor improvements in the construction and arrangement of the lines and the apparatus employed, to promote the efficiency of my system, all as hereinafter more fully and in detail set forth.

In the drawings accompanying this specification and forming a part thereof, Figure 1 shows a line arranged on my system, and operated by a vibrating current-varying apparatus. Figs. 2 and 3 show revolving apparatus for the same purpose. Figs. 4, 5, 8 and 9 show different arrangements of the condensers and circuits. Figs. 6, 7, 9, 10 show electrical receivers arranged in the circuit. Figs. 11, 13 and 15 show the lines adapted more especially for taking currents off by movable cross-connections, with electrical receivers also inserted in the sections, and the method of arranging branches or extensions in connection with the original or master line. Figs. 12, 14 and 15 show the method of connecting the lines together, and Fig. 15 shows how a return circuit may be dispensed with, and the line still be operated by induction from both ends. Fig. 16 shows the construction of the magnetic parts of my apparatus. Figs. 17 and 18 show a transformer inserted between the generator and the polar condensers to modify and graduate the charging currents. Figs. 19 to 23, inclusive, illustrate the method of arranging parallel or branch conductors, and obtaining any desired difference of potential between opposite points in them. Fig. 24 shows the arrangement of generators of counter electromotive force in branch conductors. Fig. 25 shows the means for controlling the local circuit containing S B, Fig. 11. Figs. 26 and 27 show inductive translating devices in the line, with generators of counter electromotive force in the local circuits; in Fig. 28, showing similar inductive devices in the line, the local circuits are continuous lines, while that in Fig. 29 is a sectional line. Fig. 30 represents an arrangement for automatically changing the switches of Fig. 15, and reversing the control over the line.

The general principle of my invention may be illustrated by the arrangement shown in Fig. 1. The generator may be any kind of producer or source of electric current, electromotive force or electric potential, in any form,—whether it be a machine, a primary or secondary battery, a thermo-electric or photo-electric battery or pile, or any other device. In the figure it is for convenience shown as a battery, B. C is the apparatus for varying the normally straight current furnished by the generator, and may be any suitable device for reversing polarity to produce alternating currents; for opening and closing the circuit, to produce interrupted currents; for varying the volume potential or electromotive force, to produce undulatory or vibrating currents; or for in any way varying the charge of the condensers connected to the poles of the apparatus. All such devices I call "current-varying apparatus." In Fig. 1 the well-known pole-changer is for convenience represented as employed to reverse the polarity of said charges. It is automatically actuated by the local battery B', in a local circuit passing through the magnet M', the bar *i* of the pole-changer, spring *r'* on its end, and set screw 1, then back to the battery. 2 2 are the usual set screws for limiting the play of the bar *i*. The screw *l* is adjusted to regulate the interruptions of the current, by breaking contact with the spring $r'$ when the magnet draws down its armature on the bar, and allowing the bar to be drawn back again by the spring $r$, as is usually done with automatic circuit breakers. The spring $r'$ may be insulated from the bar $i$; the magnet $M'$ may be actuated by a branch from the main battery or generator B; the bar may be actuated manually or otherwise whenever desired; and other obvious variations in the arrangement may be made, without at all departing from the principle of my invention. At the other end of the bar are arranged the usual spring levers 4, 5, connected to the poles of the battery, and the fixed stop or rest 3, which, with the bar $i$, is connected to the external circuit or the earth, as will be readily understood from the drawings. In this case, the poles of the generator are designated by $P'$ and $P^2$, where they are connected to the condensers $K^1$, $K^{14}$, at the ends of the sectional line shown, which extends from the terminal or polar condensers through all the intervening sections and condensers. The length of the contact and speed of the vibrations may be regulated by adjusting the set screws 2, 2, and 1, the springs $r'$ and $r$, the strength of battery $B'$, etc., as usual. The difference of potential between the poles may also be varied, as by a switch S, to include more or less of the battery in the circuit, as well understood.

The bar $i$ being caused to vibrate, the action is as follows: At the instant when it is in the position shown, the positive pole of the generator is connected to $P'$ and $K'$, and the negative pole to $P^2$ and $K^{14}$. This gives the condenser plates which are electrically connected with $P'$ a positive electrical charge, which has substantially the same potential and density as its source. The opposite plates are thereby charged negatively to an equal potential and density, and their positive electricity (and that of the line section between $K'$ and $K^2$) is driven to the other end of the section, where the plates of $K^2$ connected to it are given a positive charge substantially equal to that of $K'$. The opposite plates of $K^2$ are also charged negatively, as explained with $K'$, which also causes a positive current or impulse to be sent over the next section to $K^3$. In like manner, each successive condenser is charged, and positive currents or impulses are sent over the successive sections to the end, where $K^{14}$ is thus charged negatively on the plates connected to $P^2$. At the same instant when the above action occurs, a similar but inverse action takes place at the pole $P^2$, which charges $K^{14}$ negatively, and sends a negative impulse or current over the line to $K'$ and $P'$, thus reinforcing and doubling the work done at pole $P'$. At the next instant the poles are reversed by pole-changer C, each condenser instantly discharges into and over the line section connected to it, and is charged in the reverse sense, producing the before described series of results but in the opposite direction. In this manner there are sent over the line currents or impulses of alternately opposite directions, whose electromotive force depends on the potential at the generator, and their strength or volume upon the capacity of the condensers, as fully explained in my said former case. Strictly speaking, it would be more correct to say that the potential at the generator determines the maximum potential of the current, and the capacities of the condensers determine the volume of current which can be supplied by them during the period of time occupied by one reversal or variation of their charges,— i. e., the greater the quantity of electricity contained by the charged condenser, the larger the current it can keep up during the given time. But the volume of current which can flow over a section also depends on the relation between the potential and the resistance in the section. In fact, the whole system is more or less interdependent.

The electromotive force and the rate of reversal or variation at the current generating and varying apparatus, the capacities of the condensers, and the resistance in the sections, should all be properly coördinated and adjusted relatively to each other according to the method fully explained in my said former patent, in order to produce a continuously flowing alternating current on the line having the strength and character desired in each case, and my general method consists in so coördinating and adjusting the elements of the system. That method may be here briefly illustrated as follows: We may take as our starting point the normal difference of potential, D— of —P, to be employed on the line. Then the volume of current required will determine the maximum resistance, R, to be alllowed in a section, and the maximum total resistance in the line will of course determine N, the number of sections necessary to contain it. The line-capacity L—F, of the condensers determines the length of time, T, in seconds, for which they can keep up that flow of current, and this time fixes the rate of reversal or variation required at the current generating and varying apparatus in order to give that charge to the condensers. Or, we may begin our calculations with a given volume of current to be furnished or a given resistance to be overcome, or a certain size of condensers to be used, or with any other part of the system fixed, and by arranging the other parts to suit that one, as just described, we can construct a system which will produce the required results.

When a Cardew voltmeter is used for measuring the volts of an alternating current, in a circuit without self or mutual induction, the reading obtained is the average or mean of the voltage, and is mathematically expressed by electricians as equal to "the square root of the mean square of the volts." But for every-day practical work we may assume that the D— of —P given by such measurement is one-half of the extreme D— of —P actually existing in the current alternations, and that is the formula I employ. The condensers must of course be charged up to these actual current potentials, or to 2 D— of —P. The D— of —P as measured = the D— of —P of the current or condenser ÷ 2. The amperes which can flow over the section = D— of —P as measured, ÷ the R of the section; and, conversely, the R allowable in a section = D— of —P as measured, ÷ the amperes required. As all the condensers charge up at the same rate, the flow of current on the line is determined by the maximum R in any section.

In computing the required capacities of the condensers, the charge contained on each side of a condenser, in coulombs = D— of —P of the condenser, multiplied by the capacity, F, in farads,—provided time is given to become fully charged. When a series of like condensers are connected to the pole of an electric generator, the working or line-capacity, L—F, of each, is its individual capacity, F, divided by the number, N, in the series. The charge of each will then be, in coulombs, = D— of —P of the condenser multiplied by its line-capacity, L—F. Or, coulombs = twice the D— of —P of the current as measured, multiplied by the line-capacity. The charge being given in coulombs, for a given line-capacity and D—of —P of current required,—the length of time, T, in seconds, = coulombs ÷ the amperes required. If T is 1/500 second, then the current should be reversed 500 times per second in order to keep a current continuously flowing, and the generator must supply a D— of —P equal to twice the D—of —P of the current as measured by the voltmeter. Conversely, the coulombs of charge required to furnish the given current = the amperes of current, multiplied by the time during which the condenser must furnish the current. As an example, suppose we want on the line 50 amperes of a 1000 volt alternating current, reversing 500 times per second. Then 1000 ÷ 50 = 20 ohms R for a section, which may be arranged in multiple arc, in series, or in any way to properly utilize 50 amperes of current. If we have 100 ohms R. in all, we will require 5 sections. 50 amperes, multiplied by 1/500 second = 1/10 coulomb of charge required in each condenser. The capacity of a condenser in farads is found by dividing the charge in coulombs, by the D— of —P between its plates. In this case, 1/10 coulombs, divided by 2000 volts = 1/20,000 farad, = 50 microfarads, which is the line-capacity required. As L—F = $\frac{F}{5}$ it follows that the line will contain 5 condensers of 250 microfarads each. No allowance is made for losses in the condensers, etc., as the actual D— of —P of the current will exceed the value assumed in the formula sufficiently to offset all losses.

The foregoing outline will explain the general method of arranging a system according to my invention, but for full details reference should be had to my said former case.

The apparatus before described answers very well for moderate speeds, and in certain cases,—as for isolated plants, telegraphy, telephony, and the like. For more rapid reversals, and with more powerful currents, a revolving circuit-breaker may be used, as shown at $Co$, in Fig. 2, where $w$ is a commutator or circle of segments insulated from each other, but each one connected to a corresponding segment in a similar wheel W, which has the non-conducting segments (shown black in the drawing) of equal width with the conducting ones. W and $w$ revolve together. Two brushes, 6 and 7, bear on opposite sides of $w$, which are connected to the poles or brushes 20, 21, of the generator M M, shown as a dynamo-electric machine, but it may be a battery, or any suitable source of electricity. These brushes, 6 and 7, are arranged to bear on two or three segments of $w$ at once, as, by making the segments spiral (as seen in Fig. 3,) and using a broad brush or two connected brushes. If one is used, its bearing is midway between the bearings of the two outer brushes, $P^1$, $P^2$, upon W. The object of this is to connect each inner brush to both of the outer brushes shown near it. $P^1$ consists of two brushes bearing on opposite sides of W and electrically connected, and $P^2$ is similarly arranged. Thus $P^1$ is alternately connected to each pole of the generator as the wheel revolves, as also is $P^2$ to the opposite poles. When desired to break contact sooner, as explained with Fig. 1, the brushes may be adjusted for that purpose, or the non-conducting segments may be made wider than the conducting ones,—all of which is well understood by those versed in the art. Any number of lines may be connected to each of the poles $P^1$ and $P^2$, as explained in my said former case, and the ends of several such lines are shown in Fig. 2.

The wheels W and $w$ may be revolved by any convenient means, which is shown in Fig. 2 as an electric motor E M, actuated by a battery $B^1$, and connected by belting $b$ to W. Of course the motor may be driven by a portion of the current from the generator M M, if desired, as is indicated by the dotted branch of the local circuit, $a$ $a$.

In Fig. 3, W and $w$ are placed on the axle of the motor. The brushes are omitted for the sake of clearness. By putting similar wheels W *w* on the other end of the axle, two separate currents can be synchronously varied, as shown by W, Fig. 16, in my said former case. Any equivalent or suitable arrangement may be used for reversing or varying the currents for transmission over my line as already described, and its speed regulated in the usual ways, as by a switch S, for varying the strength or tension of the battery or current employed to drive it; by a brake; by a governor; or otherwise. When a dynamo-electric or similar machine is used for generating the electricity, the wheels W and *w* or their equivalents or substitutes may be mounted on the axle or shaft of the machine or driven by it, and its speed adjusted by any suitable or well known means. The potential of the currents supplied by the machine may also be varied, as by changing the connections of its coils, or adjusting the speed, etc., as is well understood. The currents thus produced and sent over the sectional line may be utilized as usual by inserting any desired electrical receivers in the line conductors or branches, as is done with all other systems using continuous lines.

If a cross-connection is made between two lines at points of different potential, current will flow through it, and in proportion to the difference of potential between its terminals. I utilize such cross-connections for service. The most convenient way is by arranging contiguous lines, carrying currents in the same direction, with their condensers alternating in position, each condenser being opposite the center of resistance of the adjoining line section, as shown in Fig. 11. By this means, the service cross-connection, arranged transversely, may be moved along the line as desired, and there will always be a uniform difference of potential between its terminals, no matter how near to or far from the generator it may be located.

For the purpose of describing the action of cross-connections, two halves of the same line, as in Fig. 1, or two branches of the same half, as in Figs. 2, 4, 5, 11, 12, 13, 14, 15 and 23, or two branches of the same section, as between $K^{11}$ and $K^{12}$ in Fig. 1, also in Figs. 19, 22 and 23, or any two parallel or approximately parallel conductors conveying current corresponding to the line current, may be considered as two separate lines, as their action is the same as if they were two lines, each of which returned to the opposite pole of the generator, as in Figs. 2 and 13. These service cross-connections are represented by a series of short parallel lines, as N N, or $L^3$. They may be permanently connected at their ends or terminals N N by any suitable clamp, joint, or other connection to the line, or their terminals may be movable along the lines and consist of brushes or other contact makers.

When a system is well supplied with cross-connections, one or even several breaks in the line will not seriously disturb the action, except between the break and the nearest cross-connection, as all the neighboring parts of the system are drawn upon for current to equalize and perfect the action. If a considerable length of line is gone, (as across a river, or other inaccessible position,) temporary cross-connections from the broken ends to a neighboring line, as at *n*, *n*, in Fig. 11, will restore the efficiency of the line up to the break, until repairs can be made.

In order to allow the service cross-connections to be moved along the line without electrically connecting the two consecutive sections at the condensers, I arrange the sections with an opening between their contiguous ends, as between the sections L and $L^1$ in Fig. 12, which opening I close with a non-conducting (*i. e.*, not electrically-connecting between the sections,) strip $L^2$. K is the condenser, which is connected by conductors to the ends of the line sections L and $L^1$. Fig. 12 also shows a contact-maker which may be employed as a movable terminal N for the service cross-connection. It consists of a suitable frame work, mounted on two metallic wheels, by which the current is taken up from the line or track, and is then conducted across by $L^3$ to the other terminal. When this device is moved onto the non-conducting strip, $L^2$, the current is cut off, because $L^2$ is longer than the contact base of the terminal N. If the terminal is moved along rapidly, the intermission is but momentary and is of little importance. When desired to have the current continuous, a supplementary contact-maker or switch T is added, being supported by or jointed to the frame work, having a handle *t*, by which the end may be brought into contact with the next following section of line. S is a catch for holding it normally out of action when turned down as shown. T may be operated automatically, by inserting a detaining magnet M in the main cross circuit $L^3$, and T in a branch circuit around the magnet. *r* is a spring which forces T down when free to do so, pulling on an arm of T, but is normally prevented by the attraction of the magnet M for its armature, which is carried by the arm of T. As soon as the current through M is cut off, the spring *r* forces T down, and the current again flows through the cross-conductor $L^3$ by way of T and the branch conductor. A similar terminal may be used at the other end of $L^3$, and facing in the same direction.

In arranging a line or system of lines for utilizing currents in service cross-connections, as described, the terminal or polar condensers of the lines may be placed together or alongside, by inserting in one of the sections a resistance sufficient to bring its electrical center opposite the other condenser, as shown by R in Figs. 11, 13 and 14. This resistance may be utilized, in any way desired, as in working apparatus at the generating station, or it may consist of one or more loop lines for outside service, as shown by $R^1$. This arrangement may be applied in any section of the line, and enable the condensers to be placed in any desired relative positions. It can, also, as before stated, be applied to adjust two branches or conductors in the same section, to bring the point of zero potential in one of them opposite to the end or point of highest or lowest potential in the other, and vice versa. The cross-conductors can then be connected at opposite points, instead of connecting them at points diagonally across, as was shown between $K^{11}$ and $K^{12}$ in Fig. 1, in order to get the required difference of potential between their terminals, N, N. Any desired difference of potential may be obtained between opposite points in the branches by inserting the proper amount of resistance, R, in the alternate ends of the two section-branches, and thus enable them to be arranged in any desired relative positions, as was explained for two adjacent lines or sections. This is shown more clearly in Fig. 19. Between condensers $K^1$ and $K^2$ is a section consisting of two branches of uniform resistance, having a potential of $-100$ at one end and $+100$ at the other, the condenser plates being charged to those potentials, as marked. At uniform distances the two branches are connected by cross-conductors, which, extending diagonally between the branches, meet them at points of different potential, and currents will therefore flow through such cross-conductors. Between $K^2$ and $K^3$, these cross connections are duplicated in the transverse direction, both the branch and cross conductors containing electrical receivers $El$. Between $K^3$ and $K^4$ are three branches, with numerous cross-connections in both directions. If these various conductors are electrically connected at their crossings, it is evident that a current coming from the left, for example, can flow through the cross connections, either upward or downward, since in both cases it will be progressing toward the other condenser. By suitably arranging a section in this manner, a break in one of the cross connections, or even in the main branch conductors, will produce but little effect, owing to the numerous paths still remaining open for the currents to take from one condenser to the other.

By inserting the resistance R or $R^1$ in the sections, as before explained, I can produce any desired difference of potential between points directly opposite each other, so that I can attach my cross conductors transversely instead of diagonally. Between $K^8$ and $K^5$ are shown such arrangements of the sections directly over them. Between $K^8$ and $K^7$, R equals one-half the resistance of the branch in which it is inserted. The working end of each section, next to R, is therefore at 0 potential, while the end of the opposite branch is at 100 volts. A cross connection between these opposite points will therefore have a difference of potential of 100 volts between its terminals. And a like difference of potential will be found if the cross connection is placed at any other point between the condensers, or (if the whole line is similarly arranged,) at any point in the line, whether near to or distant from the generator. The centers of resistance of the branches are marked O, and on each side of O are the signs indicating the polarity of each half of them. From zero potential to the negative armature of the condenser, the branch conductor is minus potential, while the other half is plus or positive potential.

Between $K^7$ and $K^6$, the resistance consists of the loop line $R^1$ with its electrical receivers. In this case $R^1$ is shown as equal to one-fourth the resistance of the branch containing it, therefore the working end of the branch is there 50 volts potential, while the end of the other branch, opposite, is at 100 volts. A cross connection will therefore have a difference of potential of 50 volts between its terminals, no matter where it is placed, as is seen by the potentials marked on the branches at different points, at the ends of the dotted cross lines. In like manner, by suitably varying the resistance of R or $R^1$, any desired difference of potential is obtained within the limits at the condensers.

Between $K^6$ and $K^5$, the resistance R in the outer branch equals one-half that of the entire branch. In the center branch, R equals one-fourth the resistance of the branch. Consequently, any point in the center branch has a potential midway between the potentials in the outer branches, as will be seen marked in the drawing. It is of course understood that the resistances in the various conductors are so arranged that the different electrical receivers in them will get their proper currents. A certain volume of current flows between the condensers, and can be caused to divide up between the various conductors in any required proportions, by properly proportioning the resistances. The polarities marked indicate the direction in which the currents will flow when the condensers are charged as marked. At the next instant the charges are reversed, and the currents flow through all the conductors in the opposite direction. Between $K^4$ and $K^5$, Fig. 19, and in Fig. 22, are shown similar arrangements. Fig. 22 is the same as Fig. 19 between $K^8$ and $K^7$, except that it shows a number of the cross-conductors with their electrical receivers $E^1$. Between $K^4$ and $K^5$, in Fig. 19, three pairs of branch conductors are shown, each of which is equivalent to the pair in Fig. 22. Only a few electrical receivers are shown at E¹, but any desired number may of course be inserted, as in any other multiple arc arrangement. In Fig. 23, the previous explanations show how any desired difference of potential is obtained between two adjacent sections. In Fig. 20, several branch conductors are shown, arranged as before explained, so that they may be connected by cross-conductors at any desired points. The resistances R or R' in each branch can be electrical receivers or loop lines for service, as before explained. The conductor from the armature of the condenser to the working ends of the branches is of course made of very low resistance, as is seen by the enlarged portion opposite R in Fig. 19, between K⁴ and K⁵, to prevent any fall of potential up to that point.

In Fig. 21, the branches, instead of being connected directly to the condensers as in Fig. 20, are all arranged as derived circuits from two branch conductors, whereby only two resistances, R, are required for all the conductors in the section. One set of conductors are shown in full lines, alternating with the other set shown in dotted lines. The conductors to the working ends of the branches are of low resistance, as explained for Fig. 20. The method indicated in the foregoing figures and arrangements can be varied in many ways, to suit all the requirements of service. It will of course be understood that it is not necessary to arrange the lines parallel, as shown, or in any particular manner, in order to be able to apply and use these service cross-connections, but they may be attached at the points of proper potential in the lines, regardless of how the lines are arranged. And in insulating such a system the only losses which need be specially guarded against are those from leakage around the condensers, and between consecutive sections, as between L and L', in Fig. 12. This should be inconsiderable, however, on account of the minuteness of the periods of time during which it can occur, and the fact that insulating substances do not deteriorate under the action of alternating currents, as they do with straight currents. Leakage between adjacent lines comes next, but in this case there is only one-half as great difference of potential to provide against.

A number of lines may be connected to the same poles, and arranged parallel with each other, as shown in Fig. 13, or in any other suitable manner. If the different lines have not the same line-capacities, they will (in any time less than the maximum) be charged to different potentials, which will be inversely as their capacities, as is well known. Hence, time enough should be allowed between the reversals or variations of charge to fully charge those having the largest capacities, if it is desired that they shall have equal potentials. Two (or more) lines may be connected and operated by a single series of condensers, when they are near enough together, instead of using separate condensers for each line. Fig. 12 shows how two lines may be operated by one set of condensers, by connecting both to the same armatures or plates. L and L' are the consecutive sections of one line and L⁴ and L⁵ those of the other line. Thus the two lines in Fig. 13 may be run by one set of condensers, instead of two, as shown, by inserting a resistance, R, in the alternate ends of the contiguous sections, as explained for the section branches between K¹¹ and K¹² in Fig. 1. And in Figs. 19, 20 and 23, as well as in all similar arrangements, the condensers may be located to one side of the line or lines proper, and be connected thereto by suitable conductors, in the general manner shown by Figs. 12 and 14. But the condensers may be made in parts, whereby the two lines could be electrically insulated from each other, even when operated by the same condensers, as shown in Figs. 4, 5, 8 and 9. Each part may have a switch or other convenient arrangement for putting it in or out of service, as shown in Fig. 8, where the two left hand switches S' and S² are turned to break the connection between the fractional condensers to which they are attached and the circuit L, while the switches S³ and S⁴ put the other fractions of the condenser in circuit. This circuit may be in the main line, or in a branch thereof as seen in Figs. 4, 5 and 9, or in a side or independent branch line, or arranged in any way desired. In Fig. 5 the enlargements on the two branches represent electrical receivers of any kind, for utilizing the currents flowing over them. These branches or derived lines may also consist of sections connected by condensers, as represented in Figs. 4 and 9. The capacities of these condensers should correspond to those of the fractional condensers from which they receive their charges. By giving to the fractional condensers the proper capacities for the work to be performed, just the proper volume or potential of current, and no more, can pass through the lines or electrical receivers connected to them. The branch circuits may continue between the two main line condensers, in the manner shown in Fig. 9, or they may unite at any distance from the one, as seen in Fig. 4, to form a main line conductor L, or a service cross-connection L³, or may have a ground connection at E. It should be understood that any part or arrangement of my system will operate with only one end of the line connected to one pole of the generator, and the other to earth, as is indicated at E, in Figs. 1, 4, 5,—but the inductive power of the line condensers will be only one-half as great as when both ends of the line are connected to the generator poles, which is the proper arrangement of my system for the best results. Another difference in the action is this: Supposing that there is an electromotive force or difference of potential between the terminals of the generator,—for example, of B, in Fig. 1,—amounting to 100 volts, then this potential will be differently distributed in the two cases. In my complete system, the potential at pole $P^1$ will be $+50$, and $P^2$, $-50$. But if the line is grounded, as indicated by the dotted lines at E E, then $P^1$ will be $+100$, and $P^2$ or E will be 0. That is to say, the line would, in the latter case, require to be maintained at a potential twice as high (relatively to the zero potential of the earth and all adjacent objects) as in the former case. All other things being equal, the loss from poor insulation, and other leakages, would be twice as great on the grounded line as on the double-pole line; or, with the same insulation, etc., the latter could carry currents of double the potential of the former, with no more loss by leakages. In fact, however, the superiority of the double-pole over the single-pole or grounded arrangement is still greater, as will be evident to electricians upon considering the action of my system, and I therefore need not further explain the same.

In the drawings, one side or half of the condenser is represented as entire, i. e., the plates are all electrically connected. But both halves or sides may be constructed in fractional parts, as shown and described. On the other hand, separate condensers may for convenience be arranged together, independent of each other but virtually forming one condenser, so as to be coupled up, for quantity, as many of them as desired, as well understood.

Fig. 9 may be a section of the main line divided into branch sectional lines as before mentioned, to each of which separate duty is allotted. It is represented as containing an electrodynamic motor, whose field magnets M M are in one branch, and its armature A in another. Its terminal condensers K K are connected to adjacent sections L L of the line. It may also be a service cross-connection between the terminals N N, similarly arranged in branches. The circuit and the currents in a service cross-connection may be manipulated and arranged in the same manner as the main line sections, in every respect.

Before leaving the subject of fractional condensers I will, for the benefit of operators who may not be well versed in the laws governing the action of condensers, explain more fully the effect of cutting out a part of one side while still using the whole of the other side (as shown in Fig. 8) for the purpose of obtaining the proper potential or volume of current for the electrical receivers, as stated in the description of the derived sectional lines,—so that they may know what to do and what to avoid in order to get the current they require. I will simply state the method employed, (which, of course, applies to all circuits, as well as to derivations,) without rehearsing all the laws and principles involved, as they can look those up in the books for themselves, if they wish.

If one of the branch circuits in Fig. 5 is opened, the current through the other branch will not be the same as before, because the condenser which furnishes the current would then have unequal working sides, and their charges will have different characters, although the amount of electrical energy may be the same in each. In Figs 4, 5, 8 and 9 this inequality is for convenience shown as a difference in the number of the inductive plates. But in practice it is also produced by a difference in the sizes of the opposing plates, or in their positions, or arrangement, as is well understood by makers of condensers and electricians. All the plates which are similarly arranged and electrically connected are equivalent to one plate of their joint size. Different condensers arranged together, with their plates alternately $+$ and $-$, will act as one condenser. Inspection of the figures will show that if the two sides of a condenser, for instance, K, in Fig. 8, have unequal sides, their "capacites" will be correspondingly different. If a condenser with equal sides has a certain "capacity," that is the capacity of each side. If one of the sides is then increased or diminished ten times in surface or size, that side will have its capacity correspondingly changed, relatively to the other side,—always provided that the plates are properly arranged to act as a condenser. If three of the parts in Fig. 8 are cut out by the switches, then the lower half of K will have only one-fourth the surface of the upper half, and if charged to an equal density will have only one-fourth the quantity. But it is well known that the quantities of the $+$ and $-$ charges are always equal, and that the side having the smaller surface will be charged to a higher potential, and so contain a charge or quantity equal to that on the larger side. It also follows that the current sent out by the smaller side will have a greater potential. If the other end of the conductor or section L $L^3$ in Fig. 8 is similarly connected to a fractional condenser of the same kind and size as K, (as is shown in Fig. 9,) then, although the energy of the current sent over that section may be the same as in the other sections which use the full capacities of the condensers, yet the potential and the volume of the current will be different in this section. This is plain from the laws of induction in condensers. Consequently, if the lower half of K is charged to a higher potential, the current over this section will have a greater D— of—P, although the currents over the two adjacent sections have the normal D—of—P of the line. On the other hand, if the capacities of the inner or contiguous sides of these two condensers are greater than those of the outer sides, the D—of—P of the current over this section will be less than those over the two adjacent sections.

Any desired difference in the potentials of the charges on the two sides of a condenser (within practical limits) can be had by making their respective capacities inversely proportional, and thus any desired D—of—P will be obtained in the current over a section supplied by such condenser or condensers, giving the consumer power to take off a current of any character desired, within the capacity of the generator. In the same way, the D—of—P and the volume of the current over the branch or derived sectional lines in Fig. 4 can be adjusted to suit the electrical receivers therein, by varying the sides of the fractional main-line condenser K, as stated in the description of those lines. If the section L L³ is connected to earth, as shown in Fig. 5, only one side of one condenser need be adjusted, to secure the desired D—of—P of current over that conductor or section as before described.

It will of course be understood that the conductors or sections may be arranged to contain electrical receivers in series, multiple arc, or any other manner preferred, according to the methods well known to electricians, especially when the section is connected to earth at its further end, as in Figs. 4 and 5. But when the section forms a portion of a line which extends on beyond it, or on each side of it, the arrangement must obviously include some means for maintaining the continuity of the line, so that there shall be no opening of the circuit and breaking of the current. This can be done by equivalent resistances, in shunts around the electrical receivers, and other well known methods, (such as those commonly employed in series circuits and the like,) or by the arrangements shown in Figs. 1, 4, 5, 9, 11, 12, 13, 14, 15, 18 to 22, inclusive, and the like.

The length of the line sections in my system may be from a few inches or feet up to 1 mile, 10 miles, or 100 miles or more, the length and resistance being a matter of judgment and expediency, and depending on the work to be done and the circumstances in each case. In other words, it may be as short as desired, or as long as it is found practicable or economical to run a single continuous circuit for the same service, by other systems. Each section is in effect a complete circuit, of itself, operated from its ends. The fact that there are other circuits arranged in line or series with it, is a matter which concerns only the individual capacities of the line condensers, to secure the proper line-capacity, as fully explained in my said former case. Although, in theory, the terminal or polar condensers do not become completely charged until all the interior ones, from the center out, have done so, and additional condensers would seem to require additional time to charge the line, yet practically this difference may be disregarded.

The resistance of the line sections will be governed by the circumstances in each case. If the currents of the section are to be utilized by electrical receivers inserted directly in the line, then they should constitute the major part of the resistance, and that of the section itself should be kept low. For taking off currents by service cross-connections, the contrary course may be taken,—the line being of comparatively high resistance, and the cross-connections (with the electrical receivers in them) serving to furnish paths of (preferably) lower resistance, for the current to reach a point of low potential, by way of the cross-connection than by way of the line section which it leaves. If, however, they connect two different lines, each of which is operated by its own set of condensers, as in Figs. 11, 13, 14, 15, and 23, the resistance in the cross-conductors is preferably made high. Where a section is to be used in both ways, a medium arrangement is adopted, suited to the particular case. Every section or part of a line may be arranged differently, according to what is wanted of it. If service cross-connections are used, in any portion of the line, the working will be best when they are numerous, and distributed over the whole of that portion.

The size of the line conductor will of course be as small as possible, for the sake of economy in cost, at the same time keeping the resistance as low as may be in each case. Then, knowing the maximum amount of electrical energy to be delivered in the section, the capacity of the line condensers should be such as can deliver, or discharge, currents having the desired strength. The potential at the generator should be sufficient to cause the full and prompt charging of the condensers throughout the line. When thus arranged, the condensers of each section will (or can) send or deliver upon it currents of the same strength. And if one section is adapted for so delivering a certain amount of energy, say 50 H. P., then such sections may be added on, and the length of the line so increased to any reasonable extent, without increasing the size of the line conductor, and 50 H. P. in current will or may be delivered for use in every section throughout the line, provided the prime generator is able to supply the amount of electrical energy required in the sections and keep up the potential of the charges in the condensers. Work done or resistance overcome simply increases the time required to effect the charging, if the same potential is maintained; or, if the potential be increased, the time remains the same. Therefore a higher resistance in the individual sections calls for a higher potential to overcome it, precisely as in all other electrical work.

The amount of power delivered may be increased by increasing the rapidity of the current alternations or variations, i. e., the number of times that the condensers discharge over the line. If a current having a certain amount of energy is sent over the sections at each discharge, then doubling the number of discharges per second doubles the power supplied on each section. If that amount of power is not called for in any section, the condensers of that section reach their proper potential more easily. If the condensers do not become completely charged with that rapidity, the potential at the generator is increased to make them do so.

The resistance should be approximately equal in the several sections, if it approaches the limit of the charging power of the section condensers, but this is not essential if it be less than that. For example, if an electrodynamic motor (or other generator of "counter electromotive force,"—by which term I mean inverse extra currents and all opposing or "counter" currents or electromotive force in the original coil or conductor, including static charge and self induction) be inserted between two condensers, as shown in Figs. 6 and 7, or with its armature between two condensers as in Figs. 9 and 10, the normal line current through it is of course lessened by the opposing electromotive force produced within it, and a longer time is required for sufficient current to pass through it and fully charge the condensers. If, then, the interruptions or alternations at the generator are so rapid that the current is reversed before the condensers of this section become fully charged, the motor will have received less than the full amount of current through its coils when this reversal occurs, with a corresponding loss of power. The same effect is produced if inductive resistance is generated in or by the conductor itself, such as self induction, static charge, or the like. If the sum of this inductive virtual or pseudo-resistance and the real electrical resistance in the section is greater than that in the other sections, it should be lessened. The method of lessening the inductive resistances in the conductor itself, such as self induction and static charge, is explained in my applications No. 29,882 and No. 73,908. If not greater, then the potential at the generator should be increased, to perfect the action of the line and increase the power of the motor. In Fig. 6, the field magnets M M, may constitute a high resistance shunt around the armature, or there may also be other circuits between the condensers in Figs. 6 and 7, to modify the action before described. And various modifications and combinations of the coils of the armature and of the field magnets may be adopted to secure special results, as is well understood. Fig. 24 is an illustration of generators of counter electromotive force arranged in three branches of a section.

In all of the figures, the pole pieces and other minor parts of the electric machines and apparatus are omitted for the sake of clearness, not being necessary to the explanation. For the same reason the different parts of the apparatus are not shown in their real proportionate sizes, as in Fig. 2, where the circuit-breaking apparatus Co is shown as much larger than the dynamo-electric machine M M, because the former is new and is being described, while the latter is old and well understood. It should therefore be understood that the drawings are not designed to represent actual construction of working apparatus, but simply conventional symbols of elements whose construction is well understood by those versed in the art, and that I have only shown such parts as were necessary for the explanation of my invention, i. e., of my combinations and arrangements of those elements and parts. For similar reasons, the capacities of the condensers arranged in series should be approximately equal, (i. e., none of them should be too small to discharge the proper volume of current over their sections,) except that the terminal or polar condensers may preferably be a little larger than the others, in order that they may still attract or "draw," after the others are charged, and so exert a sort of coercive action upon them and insure the complete charging of the line. When all the resistances in the line and the capacities of the condensers are properly adjusted to the electromotive force at the generator, the line currents will have their greatest potential and volume, and the line will transmit the greatest amount of electrical energy over it. Although some of these statements would be evident to electricians and were therefore omitted in my said former case as unnecessary, I have thought it well to explain more fully here, for the benefit of the ordinary operator, the principles upon which the invention is based,—especially as the same is claimed more in detail in this case. It should be remembered that, with the exception of producing the actuating currents from straight or direct currents, all of the details described and claimed in this case are parts of my original invention which is partly covered by my Patent No. 383,520; that they are equally as applicable when the currents are originally produced in the alternating form, as described in said patent, as when produced in the manner described in this application; that they might properly have been included in that patent, and would have been so included but for the fact that it was already very lengthy, and said matter was expressly reserved for insertion in this case, at page 3, lines 93 to 97, inclusive, of my said patent. The fact that any statement or claim appears in this case instead of in that is therefore not to be construed as implying that it is of later invention, for every part and detail of this case was already invented when said former specification was written, and, with the exception already mentioned which was necessarily put into a separate application, might have been included therein.

In addition to the statement regarding the nature of my invention given in my said patent, I will again indicate wherein it differs from others. My system is the transmission through condensers of continuous and uniform currents, (as distingushed from interrupted, irregular or variable currents, such as are used in telegraphy, telephony, and the like,) and their utilization by electrical receivers adapted for uniform and continuous currents, such as lamps, motors, heating and power apparatus, etc., as distinguished from telegraphic, telephonic and similar devices, which require certain predetermined and systematic interruptions or variations to be made in the currents in order to properly operate said devices. The transmission of such continuous uniform currents (instead of currents interrupted or varied so as to produce separate signals or impulses) through a series of condensers connected into a line and their utilization in such electrical receivers, as described, effects some very important practical results.

A result which has not been pointed out as clearly as its importance requires is the enormous increase in the useful work done by the condensers. By the old way of connecting condensers in series, the charge of each condenser was merely discharged into the next one without any account or measurement being made of it—in fact, the text books state that they contain no energy. Only the charge and discharge of the terminal condenser were measured and that charge was represented to be the charge of the series. In my system I insert working lines between the successive condensers and utilize the currents over them. Each condenser in the series has the same charge as the terminal condenser, and its charge contains the same amount of electrical energy. As each condenser gives as much current over the line connected to it as the terminal condenser gives, the result of my arrangement is that the total charge (current and energy) of the series is not the normal charge of a single condenser divided by the number in the series, as is wrongly stated in the text books, but it is the full normal charge that would be received and discharged by one condenser. For example, if there are 100 condensers and sections in series, I obtain by my arrangement 100 times as much useful current over the line as such a series will yield according to the text books, because I utilize the charges and currents between the condensers, instead of ignoring them according to the old way. The method of adjusting the resistances in the line and the capacities of the condensers to the electromotive force at the generator in order to secure this result is described in both cases.

By the words "suitably varying currents, E. M. F. or potential," I mean, as explained in my said former case, preferably those having the normal and proper form of alternating current waves, in which the E. M. F. increases at the same rate while the potential is rising as it decreases while the potential is falling, as it is known that such waves or alternations will charge a condenser without loss of energy, and such waves or alternations are to be understood as the form I prefer and endeavor to secure for use in my system, although I can use current with waves of almost any form. As the condensers charge and discharge at the same rate as the potential rises and falls at the generator, (provided the resistances in the line are properly adjusted,) the generator is preferably so designed as to produce waves or alternations in which the potential rises and falls in equal ratios. The charging will then be done properly, and the line will operate most economically. These additional explanations should make the principles of my invention clear even to those who have but little knowledge of electricity.

Although the currents are produced and transmitted differently in my system from others, they may be utilized in the same ways as others, and also in some ways that others cannot. I have already described electrical receivers as inserted directly in the line and in derived circuits therefrom, also in cross-connections between different lines or different sections of the same line. My currents may likewise be utilized by arranging independent conductors in inductive relation to the line or cross-conductors, whereby currents corresponding to the line currents are produced therein by dynamic or magnetic induction. In Fig. 1, IC is an example of how this may be effected, and consists of two coils, one of which is in the line section between $K^9$ and $K^{10}$, while the other coil, wound around it, is in a local circuit containing an electrical receiver for utilizing the currents, and which is shown as a magnet M, with its armature Ar and other necessary parts. In Figs. 13, 15, 17, 18, 26, 27, 28, 29, are other examples of such dynamic or magnetic induction in a single section. A loop or coil may also have its two sides in inductive relation to the line conductors in two sections which convey currents in opposite directions, whereby both act to induce currents in the same direction through the coil IC¹, between condensers K⁴ K⁵ and K¹⁰ K¹¹, is an example of how this may be done, and has its electrical receiver in circuit. It is therefore an inductor, or inductive cross connection between the two lines or conductors. This coil IC¹ is not in contact with the line, but is acted upon by the currents in both the outgoing and the return line conductors by induction therefrom, instead of by conduction, as in IC, and like the cross-conductors N N and L it may of course be moved along the line or lines in either direction, but a contact-maker is not required for it.

In Fig. 1, IC¹ is shown between the two line leads or conductors, but it may of course be arranged above, below or outside of them, as may be most desirable, so long as its two sides are in inductive proximity to the two opposite parts of the line or circuit and are acted upon as described. IC² shows an induction coil arrangement, similar to IC, arranged in the service cross-connection N N Fig. 1, which is attached between the two branches of the section. The conductive cross connection N N supplies current to its receiver IC² by conduction from the two branches, just as the inductive cross connection IC¹ supplies current to El by induction from the two line wires. Their functions are the same, but N N operates by conduction, while IC¹ operates by induction. It may obviously connect two lines or sections at points having any desired difference of potential, for example, such as shown in Figs. 13, 14, 19, 22 and 23. One coil of IC² is in the cross-conductor; the other is in inductive relation thereto, and in a local circuit $a\ a$. This circuit may contain any desired electrical receivers,—shown here, for convenience, as a telephone. Vibrating, undulating, interrupted, alternating or any other suitably varied currents passing over the line will produce correspoding currents in the local circuit $a\ a$, and act upon the receivers therein. Any other suitable arrangement may be adopted for utilizing the line currents by dynamic or magnetic induction upon and in independent conductors or devices. I also use the line currents cumulatively, to produce magnetism and for any other desired purposes, by forming the section conductors, or any desired portion thereof, into coils, and arranging two or more sections or coils to act upon a single magnet, or in a single electrical receiver. An example of this is shown in Fig. 1 at the extreme right of the system, whose four coils $m\ m\ m\ m$ constitute the major part of four different sections of the line, and all act upon the same core or magnet M, thereby combining the power of the currents of the four line sections between K⁶ and K⁹ in one electrical receiver. M may be a telegraphic sounder or relay; or the armature, Ar, with its front and back stops 2, 2, may control the electrical connections of a local circuit having its own generator and electrical receiver, examples of which are shown in Fig. 11, also at the left in Fig. 1. Or M may represent any other kind of "electrical receiver," by which term I mean any device for receiving and utilizing currents.

Other examples of cumulative action are seen in Fig. 10, where the currents sent through the motor are utilized three times, twice in the field magnets and once in the armature. In Fig. 9, the line currents are divided; one-half is used four times in the field magnets M M, and the other half is used twice in the armature, by means of two pairs of brushes. The current enters at one brush, flows in one-half of the armature coils, and emerges by the other brush, which is connected to the adjacent condenser, from the other side of which currents are sent through the remaining coils of the armature by way of the other pair of brushes. Each pair may bear on different commutators or collectors. Or any other division or arrangement may be adopted,—the object of the figures being to show how the cumulative action may be applied to a motor. In fact, my entire system is one of cumulative inductions upon a line.

In Figs. 1, 6, 7, 9, 10, 11, 13, 15, 26, 27, 28 and 29, the motors and similar electrical receivers are represented as occupying an entire section, to illustrate the principle of the action, but in practice they need not constitute a hundredth part of the resistance of a section,—unless used cumulatively. In that case, their coils may constitute the entire resistance of any desired number of sections. For example, if power is to be transmitted for use principally at the further end of the line, and not along or on the line, diminish the number of the sections in the true "line" and increase the number at the end or place of utilization, and use no power along the line, but all of it at the end.

The alternating currents transmitted by my line would usually require to be straightened or "adjusted" before being used in motors and the like as shown in the drawings. I avoid that necessity in my system, in the following manner. It is well known that if the current be reversed through both the field magnets and the armature of a motor, the motion of the armature continues in the same direction. But if the alternations be at all rapid, the magnet cores, pole-pieces, and similar parts, as usually made, could not change their polarity with sufficient rapidity, and they would also generate Foucault currents, waste energy in heating, etc. In order to obviate this difficulty, I make the magnetic parts of my apparatus of finely divided magnetic material, and electrically insulate the individual particles from each other. Fine iron filings, well annealed, may answer for ordinary uses, but for perfect work, I prefer iron whose comminution is still finer, like the iron precipitated by hydrogen. Any suitable insulating material may be used, as shellac, asphaltum, gutta-percha, rubber, etc. When the substance is soluble in a non-aqueous solvent, or one which does not act chemically on the iron, I prefer to mix the iron with such solution. For example, a solution of shellac in alcohol, or of asphalt or other material in benzole, may be employed, and the iron thoroughly mixed, stirred or ground up with it until every particle is well coated, then the solvent is gradually evaporated. Whether so mixed, or with melted insulating material, the mass is cast or tamped in molds, pressed into shape while warm, or worked into form with tools after it becomes cold. An insulating material which melts at a much higher temperature may be used, as, various silicates, enamels, glass, or any other suitable non-conducting substance, which will both insulate the particles and cement them together into a compact mass.

Any suitable cement may be used. I use as little of the insulating or cementing substance as will hold the mass together. If the particles are given a good insulating coating of oxid of lead, or of magnetic oxid of iron by the Barff or other similar process, or properly insulated in any other suitable manner, they need not be cemented together, but may be packed solidly into suitable non-metallic casings of the proper form, in a vacuum or otherwise.

Cores, etc., made as described, take the place of those which are made of solid iron, sheets, or wires, in the usual way, and contain nearly as much iron in the same cubic space. Such magnetic material I term "comminuted iron." The casings or the supports for the "comminuted iron," described, as well as the supports or frame work of the apparatus or machine, may of course be metallic wherever the magnetic lines of force will not make their path through them and produce useless currents.

Fig. 16 is a view of an ordinary electromagnet M, partly in section, whose cores, yoke, and armature are made of my "comminuted iron", which is designated by the cross-lined part d, around which is the casing c. In this instance, the iron is not cemented together but merely packed solidly in the casing c, which completely surrounds it. Further support is given by the ears or offsets e e, from the pillar g, to which the hard rubber ends v of the coils are screwed or otherwise secured. Ar is the armature lever, carried by pillar g. Its play is adjusted by set screws 2, 2, and it is drawn back by spring r, whose tension is adjusted by Sc, as usual. Of course any other suitable way of supporting the "comminuted iron" parts may be employed; and if it is well cemented together it may need no support, but have considerable strength and supporting power of its own. By making their magnetic parts of this "comminuted iron," I can therefore use my alternating currents unchanged in the motors, dynamos, etc., shown in the figures, and for all purposes except for charging secondary batteries, electrolysis, and a few minor applications. For such uses, they must first be "adjusted." I have described in another application for patent a device for straightening alternating currents, irrespective of the rapidity of the reversals, whether 1 or 10,000 times per second or more. For moderate speeds, however, St, a very simple modification of the pole-changing apparatus shown in Fig. 1, will suffice. Fig. 11, at the extreme right, shows the bar of the pole-changer actuated by a polarized magnet M, inserted between two line condensers, at 8, 9. The bar, i, and the rest or stop 3 are arranged in another branch of the main circuit. The impulses of one polarity pull the bar in one direction and guide the line current through the local circuit 4 a a 5, while the impulses of the opposite polarity act inversely and change the course of the line current through the bar i and the stop 3 so as to send it through the local circuit in the same direction as before. The electrical receivers in the local circuit, a a, may be secondary batteries S B, and any other suitable recipients of the current. R is a resistance or apparatus for regulating the current through the branch containing the secondary batteries, or cutting them out of circuit, automatically or otherwise. Fig. 25 shows one arrangement for that purpose. R is the resistance, adjusted to cause the proper proportion of the current to flow through S B when the switches S, S, are down, as shown. When they are turned up to the stops or segments 25, they form a shunt around R, while S B is cut out of circuit. Outside of the local circuit, a a, however, the current is still an alternating one, and the operation of the system is not disturbed. For more rapid alternations, the arrangement shown in Fig. 2 may be utilized in place of St, by reversing its action. I send the alternating current in at the poles P' and P², and the circuit-changing wheels W and w act to straighten or "adjust" the impulses taken from w by the brushes 6, 7, and sent through the local circuit a a, as will be seen on tracing out the course of the impulses. The only requisite is that the wheels W and w shall revolve at the correct speed, so that the brushes make contacts with the segments synchronously with the arrival of the different alternating impulses. The speed may be thus regulated by the means before described. The dynamo M M, in the local circuit $a$ $a$, may now be run as a motor, by the adjusted currents. Or the current in the local circuit may be used for any other purpose for which straight currents are adapted,—as is indicated by $El$ in Fig. 11, representing any suitable electrical receivers.

If required to change the potential or quantity of the line currents before utilizing them, that may be done by means of induction coils,—the primary coils thereof being arranged either in, or in inductive relation to, the line, while their secondary coils are in a local circuit containing the electrical receivers. Such arrangement is shown by IC and $IC^1$ in Fig. 1. and by $Tr$ in Figs. 26, 28 and 29. Where the inductive cross connection $IC^1$ is arranged as in Fig. 1, the combination of $IC^1$ and the line wires constitutes a sliding or separable transformer or induction coil, the line wires being the primary wire or coil and $IC^1$ being the secondary coil, or vice versa, and the induction action of this transformer is precisely the same whether $IC^1$ is stationary or is moving along the line, because the movement of $IC^1$ is negligible in comparison with the speed at which the current waves or impulses flow along the line. $IC^2$ shows a similar arrangement in a cross-conductor between two branches of a section, and $Tr$, in Fig. 15, shows it in a cross-conductor between two sections or two lines. Any analogous arrangement may be used. As is well known, the primary and secondary coils may be so arranged that line currents of high potential in the primary will induce in the secondary coils corresponding currents of low potential, with or without a corresponding increase in quantity or volume, as desired,—and vice versa. Such apparatus are usually termed "transformers" or "converters," and may thus supply one or more local circuits with currents of any required character. In Fig. 28, $Tr$ thus supplies currents to two local circuits $a$, $a$. In Fig. 26, one continuous circuit containing an electro-dynamic motor is supplied with current from $Tr$, while in Fig. 29 the local or secondary circuit is itself a complete sectional line whose polar condensers are charged by the currents from $Tr$. They may be used at any point or points in the line. It should be understood that such transformer or apparatus may be inserted between any two parts in my system where it may be desirable to change the potential or quantity of the currents as described, and without changing the general nature or action of the combination or arrangement in which it is so inserted. For example, a transformer or converter may be inserted between the conductor conveying the line currents and any of the electrical receivers intended to be actuated thereby, in any of the figures, without changing the character of their operation, but only the degree of perfection in the result. In Fig. 17, a converter $Tr$ is inserted between the generator and the condensers $K^1$ and $K^{14}$ shown in Fig. 1. The more perfect operation thus obtained is due to the change of potential or quantity (or both) of the currents used to charge the condensers, and their graduation,—the volume and potential of the successive impulses increasing gradually instead of suddenly, from zero potential to the points of highest position and negative polarity, and gradually decreasing in like manner. The form in which $Tr$ is here shown, that of a closed magnetic circuit or circular core with the primary and secondary coils, $Pri$ and $Sec$, on different parts of the core, separate from each other, makes their actions and their relations to the line and to the local circuit more clear although not intended as a working form for $Tr$.

In Fig. 18, the same arrangement of $Tr$ in the charging wire, between the current generating and varying apparatus and the condensers actuated by the varying currents or potentials, is shown as used to graduate the currents in Fig. 2, and will be understood without further description. At the right of the line, in Fig. 11, and also at $D^1$ is shown the beginning of an extension line, for continuing the original line, and it may, in turn, be extended in the same way. 10, 11 are the poles of the extension line, which is shown as electrically separate from the main line. It may be governed by that, however, so as to be synchronous therewith, as shown at $D^1$, which may represent one method of doing this, and show the principle. The line currents flow through a polarized magnet, whereby the bar $i$ of the pole-changer is vibrated according to the polarity and rapidity of the alternating impulses, and in so doing reverses the connections of the local generator (shown as a battery) with the poles 10 and 11 of the branch or extension line whose beginning is shown by the condensers connected to the poles 10 and 11. All of which will be plain without further description.

The local generator may, if desired, be employed to assist the prime generator, by so controlling its connections as to throw its current into the main line. A method of doing this is shown at $D^2$, where the polarized magnet controls the vibrating bar as before described, and properly reverses the connections of the local generator, which is shown as arranged in derived circuit with the pole-changer between points 8 and 9, although it may be in series therewith.

The local generator may both relay the main line current and actuate a branch or extension line at the same time, by connecting the main line local poles 8 and 9 with the generator poles 10 and 11 of the branch, as outlined at $D^3$, whereby the alternations of the main and branch lines will be both synchronous and identical. The connections of the pole-changer are as with $D^2$,—the extra poles 10 and 11 being added thereto in the drawing, merely to indicate the ends of the branch line. As in all the other figures, parts unnecessary to the explanation are omitted. These subsidiary or auxiliary lines may be either extensions or side branches, or both, and any desired number may be governed by and connected to the master line, running in any direction. The governing devices may be in any section of the main line, or arranged in inductive relation thereto, as in Fig. 1, where the electrical receivers may be such devices. They may also be arranged in cross-conductors, after the manner shown in Fig. 1. It is also evident that the governing devices need not be vibrating pole-changers, but may consist of revolving pole-changers, dynamo-electric machines, or other suitable apparatus arranged according to my invention or system, as is shown in Fig. 15, presently to be described, and also in Figs. 24, 26, 27, 28 and 29.

The ends of the sections may be brought together, as in Fig. 12, if a movable cross-connection N N is intended to pass from one line onto another. For example, in the case of an extension line, as, at the right end of Fig. 11, the arrangement may be made as shown more in detail in Fig. 14. The governing apparatus M (only the magnets of which are shown but which is the same as described and shown at M, in Fig. 11) may be inserted in the conductor running across the end of the line in Fig. 11, together with enough other resistance R, to make the crossing from L to $L^4$ equal to half of a section L, as already explained, which cross-conductor is then connected to the condenser together with a similar conductor from the end of $L^4$, and the other side or armature of the condenser is connected to R L, being virtually the same as in Fig. 11. The poles 10 and 11 are similarly connected to the branch-line sections $L^1$ and $L^5$, as shown. The two systems are arranged in line, with non-conducting strips $L^2$ between them, as in Fig. 12, so that the movable terminals can readily pass from one system to the other without interruption of the current through the cross-connection. Fig. 14 being a diagram, no attempt is made to show the parts in their correct proportionate sizes, and the black strips $L^2$ are shown greatly exaggerated in relative size. It is not material to the working of such an arrangement of two different lines with their ends brought together in line, whether the currents correspond in direction in the two pairs of parallel sections or conductors, nor whether one line is electrically connected with the other, around the non-conductor $L^2$ arranged between their contiguous ends, or not. It is not even necessary that the connecting or adjoining lines should have currents that are synchronous, or even similar in any respect. The two systems may be entirely independent, separate and unlike each other, and yet they may be operated together, if the electrical receivers in the service cross-connection are capable of utilizing the changed currents as they pass from one system onto the other, that is to say, if they can be operated by the currents of different strength, character, or speed of variation which may then flow through them. Ordinarily, however, it will be well that the lines which cover the same territory should be run on the same general plan, so that they may be well supplied with cross-connections to meet all possible requirements for currents. All of the lines and parts will then form a harmonious and mutually supporting whole while running, any part of which may be put in or out of service, at any time or place, and to any extent. With such a system of lines and connections, properly interlaced, a failure of current over an area of any considerable extent, whether in a building or a section of territory would be rendered practically impossible.

I have explained the manner of connecting and governing branch or extension lines by means of vibrating pole-changers. But the same method may be applied to the revolving circuit-breaker in Fig. 2, or to any other suitable current-varying apparatus, as will be readily understood without detailed explanations. Dynamo-electric machines and similar apparatus or devices which produce currents, electromotive force or potential may be utilized in the same manner. For example, $D^4$, in Fig. 13, shows such a machine, which may be a dynamo-electric generator, having its field-magnets in one branch of the line-section, and its armature in another. If this machine be employed as a motor, its action has already been described in Fig. 6. As here arranged and used, its action is quite different. The field-magnets are in the line, and their polarity is reversed or varied in accord with the reversals or variations of its current, but, the armature being now driven by power, at uniform speed and in a contrary direction (to its motion as a motor), it generates a current corresponding to the line current and in the same direction as that. Supposing a positive impulse to come from the prime generator, by induction from the section-condenser at the left, it energizes the field-magnets and passes on to the condenser at the right. A portion of the current also flows through the armature, which is at the same time producing a current in the same direction. This machine is therefore in series with the similar prime generator connected to the poles P¹ and P², the result being the doubling of the potential at the section condensers, and consequently throughout the entire line. The armature current therefore cannot flow backward through the field-magnets, because the current is of equal potential in that branch. But when the prime generator is reversed, the potentials of the condensers fall, a current is then sent in the opposite direction through the field-magnets, reversing their magnetism, and the armature at once produces a reverse current also. Although described as occurring consecutively, these actions are in reality practically simultaneous in the two branches and throughout the line. The armature and field-magnets may of course be arranged in series, as in Fig. 7, or in any desired combination of series and shunt arrangements of coils. These explanations apply equally to the action of the vibrating pole-changer in Fig. 11, (as well as to all other current varying apparatus similarly employed in my system,) but were deferred until now, as being probably more easily understood when applied to a machine.

D⁵, Fig. 13, shows the field magnets of a generator in the main line, which governs the action of the armature and causes it to produce currents corresponding to its own, which are then sent into separate and independent circuits, which may be either continuous or sectional. In the drawing the armature poles are shown as connected by a high resistance closing-circuit, adapted for sending out currents of any desired potential, as was fully described in my former case. In this instance the terminal or polar ends of two branch lines are shown, with their condensers. This arrangement therefore corresponds to that of the vibrating pole-changer at D¹ in Fig. 11. By also connecting the armature brushes or poles to their section-condensers, as was done at D⁴, the machine both relays the prime generator and actuates branch lines synchronously, like as shown at D³ for the vibrating pole-changer.

It may now be understood that the machines employed in the arrangements shown in Figs. 2, 6, 7, 9, 10, 13 and 15, or any others analogous thereto, may be used either as motors or generators, as desired, by making their magnetic parts of "comminuted iron", as described. And when used as generators, with their field-magnets governed or energized by the line currents, they may send the currents produced in their armatures either into the main circuit or through one or more independent lines or circuits, either continuous or sectional and arranged in any suitable manner, for use in any way desired. (The same remarks apply to "transformers" or induction-coils arranged as local generators.)

When used as motors, due regard should be paid to the fact that they take a much greater volume of current when first starting, or running slowly, than after they attain their full speed, and that in the latter case they prevent the condensers from charging so rapidly as in the former. Such electrical receivers, if inserted in the line, are preferably arranged in branches of the section, as shown in Figs. 1, 4, 5, 9 and 24, rather than in series in a single conductor between two condensers. As they will be starting, or making their greatest demand for current, at different times, they will thus differentiate or equalize the demand, resulting in a certain average current required to supply the probable wants of all of them, which the capacity of the condensers should be adapted to furnish. The same method applies to all other generators of "counter-electromotive force," so that while one is making its greatest use of current, another will be using its smallest current, and the use of current will thus be equalized and made substantially uniform.

This arrangement of them is not so important when such apparatus are inserted in service cross-connections, as at IC², Fig. 1, and in Figs. 15 and 22, and I consider the latter the preferable arrangement for electrical receivers which vary greatly in their use of current, at different speeds or in different conditions, whether said variation is caused mechanically, as by switches and the like, or by offering to the line current a greater or less resistance, either real or in the form of "counter-electromotive force."

When such cross-connections are not available, such electrical receivers may be arranged in local circuits which pass through the secondary coils of suitable "transformers" or induction-coils, whose primary coils are in the line circuit, as shown by Tr, IC, and IC¹, in Fig. 1, and Tr in Figs. 15, 26, 28 and 29. M A M in Figs. 24 and 27 show a similar arrangement of such electrical receivers in their local circuits.

The "return circuits" in my system may be arranged similarly to the other or outgoing ends, and traversing either the same locality or run through a different section of territory, as preferred. Figs. 1, 2, and 13 show such arrangements. In Fig. 11, the branch lines are shown as united, (at the point 15, in Fig. 14,) and from there the return circuit R L is a single conductor. If R L is only used for returning the line to the other pole, and no power is to be taken from it, it may be made and arranged in the cheapest and most convenient way. The conductor may be run in the air, or underground, and insulated in any suitable manner. The sections may also be much longer and fewer in number than if current was to be supplied from them for use. In short, either half, or any part, of a line on my system may be constructed and arranged according to the service desired from it. But when a return circuit is not needed for use, as, in the case of a long single-track electric railway, the further end of the line may return, not to the other pole of the same generator, but to the corresponding pole of a second generator operating synchronously with the first, as was stated in my said former case. In this way the return circuit may be dispensed with. Fig. 15 shows this. The beginning of the line is connected to P¹, one pole of the current generating and varying apparatus, which may be that shown in Fig. 2, or any analogous arrangement. At its further end this line is joined to another one, if desired, in the manner already explained. It is therefore only necessary here to state that the line currents of the first line go through one-half of the field-magnet coils of the relay generator M A² M, and those of the second line go through the other half. The poles 10 and 11 are connected to the polar condensers of the two lines in the regular manner. Another relay generator, M A³ M, may also be inserted in the line, which may be still further extended in the same way, if desired.

At the further end of the line, (which is here shown as consisting of three shorter lines, separated by the insulating sections L², but electrically connected through M A² M and M A³ M, respectively,) it is connected to P², or the opposite pole of the current generating and varying apparatus there located, which is represented in the figure as being the arrangement before shown in Fig. 2 when the three switches S S S are turned up to the stops 13, 13, 14, the general arrangement is the same as at M A² M and M A³ M, except that the whole of the field-magnet coils of M A⁴ M are energized by the line currents from one side, as this is the terminal generator. When so arranged, all the generators are governed from the pole P¹, and caused to generate currents synchronously and similarly therewith for operating the line, and M A⁴ M presents its pole P² or 20 to the line, which is thus operated precisely as if P¹ and P² were the opposite poles of the same generator. The apparatus Co of course remains still, and the current from the generator may be cut off from it, if desired. This arrangement of the switches and circuits is shown in Fig. 30. Whenever it may appear desirable, the arrangement may be reversed at the two ends, and the entire line be operated and governed from pole P². For this purpose, the three switches S S S are turned down against their lower stops, as is shown in Fig. 15. The motor E M now revolves the apparatus Co, and the operation is as shown in Fig. 2. At the same time the apparatus at P¹ should be switched out and arranged as I have previously described that at P² when the switches S S S were all up. Independent and unconnected lines may evidently be added at either or both ends, and the system thus extended to any length. One such line, L⁵, is shown in Fig. 30 as connected to M A⁴ M. Or there may be but a single line in the system, (instead of three) having the reversible arrangement described (or any other analogous one) connected at its two ends. The described turning of the three switches may be arranged to be accomplished automatically, by the presence or the stoppage of the normal currents from the line, as is shown in Fig. 30, which includes only those parts of Fig. 15 that are necessary to explain this arrangement. The three switches, S, S, S, are connected to each other and to a lever S⁵, by links or otherwise, so that they all move together. $k$ is any electro-magnetic device actuated by the line currents, which flow through it when the line is operated as shown in Fig. 30. It is for convenience represented here as a solenoid and movable core, but may be any other suitable arrangement. As shown, the core is attached to the lever S⁵, and their combined weight is supported by the spring $r$. When the high potential current from all four of the generators (M A M, Fig. 2, connected to P¹, Fig. 15, M A² M, M A³ M, and M A⁴ M,) is on the line, and passing through the solenoid $k$ on its way to and from pole 20 of the machine M A⁴ M, the core $k$ is drawn up into the solenoid and the lever S⁵ lifts the three switches into the position shown in Fig. 30.

The spring $r^5$, in combination with spring $r$, is so adjusted that it allows lever S⁵ to stay up as long as the full current flows through solenoid $k$, but if any one of the four generators ceases to act and the potential of the current falls, spring $r^5$ then overcomes the attraction of the solenoid for its core and pulls down, thereby causing lever S⁵ to shift the switches into the position shown in Fig. 15, when M A⁴ M is set in action as the prime generator, and its current (suitably varied by the apparatus Co,) is sent to line through 20, P², S, and the polar condenser, to join the currents of the other generators. If desired, the spring $r^5$ need not have quite so much tension, but be adjusted to pull the core $k$ down only when two of the other generators stop, or only when there is a break in the line and no currents come from the remainder of the line. If such break occurs, or if the prime generator at P¹ ceases to act, the line current is no longer reversed or varied, and the line ceases to act at all. At the instant when this occurs, $k$ changes the switches and sets the generator M A⁴ M and the reversing apparatus Co, Fig. 30, to work, and the line at once resumes operation under the control of pole P² and the apparatus connected with it. Thus, in case of a complete severance of the two halves or parts of the line, each half would be run from its own pole at the end, as a unipolar line, by grounding it at the break, as was set forth in my said former case. The arrangement shown in Fig. 30 and its action can evidently be adjusted in many ways. Of course, the pole P′ of M A⁴ M might be connected by another sectional line, to pole P² of the prime generator at the other end, thus forming a complete circuit like the others shown, as indicated in Fig. 2, at K and K. Or the said poles may be connected to unipolar lines which are grounded at their distant ends, as indicated by the dotted lines to E in Figs. 1 and 30; or they may be connected directly to earth, as is also shown in Fig. 1, at P². This connection to earth is necessary (for the charging of the condensers) whenever there is no circuit between the positive and negative poles of the prime generator. It is shown by the dotted line from 21 to earth at E¹ in Fig. 30. All of which will be readily understood and accomplished by those versed in the art without further explanation.

It will now be seen that my system is a reversible one. For example, if B, in Fig. 1, is a secondary battery which, by means of the pole-changer, C, sends alternating currents over the line, so, also, we may reverse the action, send currents into the line from another source, which will be "adjusted" by C, and caused to re-charge the battery B, as is shown at St, Fig. 11, where S B may represent our prime generator B. The same is true of M M in Fig. 2, as already explained. I have also shown at D¹, D², Fig. 11, and in Figs. 6, 7, 9, 10, and 13, how receivers may either receive currents from the line for utilization, or themselves be used as generators to produce currents and operate the line and its receivers. If two machines are so used, at the ends of a line, having their magnetic parts made of my "comminuted iron," the one may be a generator sending currents over the line, and the other a motor or receiver actuated by said currents; or the action may be reversed, the latter may act as the generator, and actuate the former. If both act in series as generators, the potential of the line currents is equal to the sum of the potentials at the two machines, as before explained. The armature and field-magnets of each may be arranged as in Figs. 6 or 7, whereby the motion of each will be governed by and in harmony with the other, to mutually supply currents to the common circuit. It will also be seen, without detailed explanations, that branch or extension lines which are ordinarily run by the main or master line, (by means of suitable apparatus therein, or governed by its currents,) may act inversely and themselves actuate the master line with all of its electrical receivers and connections. Figs. 14, 15, 26, 28 and 29 further illustrate this feature of my invention. All of these instances refer to receivers inserted directly in the conductor of the line, or in a conductor connecting different sections or branches, and receiving their currents by actual conduction. But the principle of reversibility also holds good when currents are induced in independent conductors, without conduction between them, as instanced at IC, IC¹ and IC², in Fig. 1, or by any analogous arrangement, as shown in Figs. 17, 18, 24, 26, 28 and 29. Not only may currents be received by the coils IC, IC¹ and IC² by induction from the line, but if we in any way cause currents to flow through IC or IC¹, as by a battery and pole changer, a dynamic generator, or otherwise, these currents will then induce corresponding currents in the line conductors arranged in inductive relation to the coils, and such induced currents may operate the line and the electrical receivers thereon. When used as "transformers," their action may be similarly reversed as shown in the other figures mentioned. Figs. 17 and 18 represent this reversed arrangement, when M, Fig. 1, becomes an apparatus for producing varying currents, through one coil of the inductive device IC, whose other coil has its ends connected to the line condensers, which it charges as before described; and thus transmits over the line currents corresponding to those produced by M,— except that they may in some cases be modified by the well known action of "transformers" in such conditions, as I have previously stated. So, also, the arrangement IC² in the cross-conductor may be reversed, for, if a suitably varying telephonic or other current of sufficient strength be produced in the local circuit a a, it will by induction produce corresponding currents in the line, which may be received and utilized in every section thereof if the system is properly arranged and adapted therefor according to the principles herein set forth. This action is further illustrated by Tr in Fig. 15. The cumulative action of my system may also be reversed, and, instead of currents being cumulatively received from the line and utilized by suitable apparatus, as hereinbefore shown and set forth, such apparatus may be employed to cumulatively produce currents upon the line for transmission and utilization. For example, the action of the receiver M, Fig. 1, with its four coils, may be reversed, and currents may be produced in the coils by other means, as by varying the magnetism of the magnet core, by vibrating the iron of the armature Ar before its pole, manually or otherwise,— or in any other suitable manner. The four coils will then join in series in cumulatively sending the currents over the line. The action of the coil IC¹, Fig. 1, may be reversed, and currents so cumulatively sent over the line by induction, instead of by conduction. The divided armatures of the machines shown in Figs. 9 and 10 are other examples of the reversibility of cumulative action in series. And this feature of my invention may be embodied and utilized in manifold ways.

Cumulative action in multiple arc (as, by dividing a section into two or more branches, and distributing the line currents between them, for use in the electrical receivers therein, as shown and described in my said former case, and at E¹, Fig. 1, in this case,) may also be reversed,— all the branches then joining in producing currents and therewith charging the same condensers. Figs. 19, 20, 22 show further examples of this.

The arrangement shown between K³ and K⁴, Fig. 9, of my said former case, and more fully illustrated by Fig. 19, in this case, is peculiarly favorable for such action. The high resistance of the two main section-branches may consist largely of electrical receivers inserted between the attachments of the cross-conductors, which latter may be duplicated by a second series of cross-conductors crossing the former as seen between the condensers K², and K³, Fig. 19. All of these cross-conductors have their electrical receivers, which, with those in the two branches, may join in multiple arc in producing currents to charge condensers K² K³, as stated. In short, any arrangement of my system for the transmission of electrical energy, wherein currents are produced by one device and received by another, may be operated inversely, as before explained. When constructed and arranged in the best and most perfect manner, as contemplated by my invention, all the parts are harmonious, mutually protecting and supporting, and the entire system is reversible throughout.

I do not confine myself to the precise arrangements, details and forms herein described, for it is evident that they may be widely varied and made in various forms without departing from the principles and scope of my invention, as will be readily understood and accomplished by those versed in the art, and I reserve the right to make such changes in practice as come within these limits.

All of the parts and arrangements herein described may be applied and in use in a single organized system and at the same time, and all are necessary parts of one complete whole. It is also evident that many of the special parts and arrangements herein described can be used in connection with the lines and apparatus as set forth in my said former case, and vice versa, as the two cases relate to different parts of the same general invention or system. For instance, the lines or systems herein shown might be actuated by alternating current machines connected to the polar condensers, instead of by straight-current generators and current varying apparatus. Many of the electrical receivers in the line might also consist of alternating-current instead of straight-current machines, as shown.

M¹, in Fig. 13, shows how an alternating current machine might be used in connection with my present system. The polarity of its field-magnets is reversed in accordance with the reversals of the line currents. The armature is provided with the usual commutator, and is connected by brushes, 22, 23, to a local circuit $a$ $a$. If it is revolved at the proper speed it will generate a straight current in the local circuit. At any other speed, alternating currents will be produced, as will readily be understood.

Having thus described my invention, what I now claim as new and desire to secure by Letters Patent is:—

1. An organized system for the production and transmission of electrical energy by repeated inductions, consisting of the combination, substantially as set forth, of an electric generator producing normally straight or unipolar currents, electromotive force or potential, and expending a certain amount of energy in "charging" condensers connected to its poles; two or more sections of conductor arranged in line or series; condensers, inductively uniting the sections into a line whose ends are connected to the terminal or polar condensers, and having capacities suitable for discharging over the sections connected to them currents having the stated amount of electrical energy; and apparatus properly reversing or varying the charges of said polar condensers; the whole arranged and operating to reproduce the original amount of electrical energy in each of the sections by the repeated inductions and electrical attractions and repulsions at the several condensers.

2. In a system for transmitting electrical energy by repeated inductions, the combination of a line-section consisting of one or more conductors whose joint resistance is suitable for conveying currents having a certain amount of electrical energy; any desired number of similar sections of approximately equal resistance arranged in series or line with it; and condensers inductively connecting said sections into a line, and having capacities suitable for discharging currents with the stated amount of electrical energy over the sections connected to them; the whole arranged and operating to transmit and deliver said amount of electrical energy for utilization in each of the sections of the line by means of section conductors and condensers which are separately suitable for conveying and delivering only the original amount.

3. The combination of apparatus for producing suitably varying currents, electromotive force or potential and therewith charging one or more polar condensers; means for regulating the speed and action of said apparatus; and one or more lines consisting of sections united by condensers and having their ends connected to said poles through said polar condensers.

4. The combination of an electric generator producing normally straight or unipolar currents, electromotive force, or potential; apparatus for suitably varying the same and therewith charging one or more polar condensers; means for regulating the speed and action of said apparatus and the nature of the currents sent by said condensers over the line; and one or more lines having their ends connected to the other sides or armatures of said polar condensers, and conveying the currents induced and discharged thereon by said condensers.

5. The combination of an electric generator producing normally straight or unipolar currents, electromotive force or potential; apparatus uniformly varying the same and therewith charging one or more condensers connected to the poles of the generator; and one or more lines having their ends connected to said poles through said condensers.

6. The combination of an electric generator producing normally straight or unipolar currents, electromotive force or potential; apparatus uniformly varying the same and therewith charging one or more polar condensers; means for adjusting the speed and action of said apparatus; and one or more lines having their ends connected to the generator through said condensers.

7. The combination of an electric generator producing normally straight or unipolar currents, electromotive force or potential; one or more polar condensers; pole-changing apparatus, reversing the connections of the generator poles to said condensers; and one or more lines having their ends connected to said poles through said polar condensers for conveying the currents induced and discharged by said condensers.

8. The combination of an electric generator producing normally straight or unipolar currents, electromotive force or potential; one or more polar condensers; uniformly-revolving pole-changing apparatus, reversing the connections of the generator poles to said condensers; and one or more lines having their ends connected to the generator poles through said polar condensers.

9. The combination of an electric generator producing normally straight or unipolar currents, electromotive force or potential; one or more polar condensers; pole-changing apparatus uniformly reversing the connections of the generator poles to said condensers; means for adjusting the speed and action of said apparatus; and one or more lines having their ends connected to the generator poles through said condensers.

10. The combination of apparatus for producing suitably varying currents, electromotive force or potential; one or more sectional lines connected to the poles of said apparatus through condensers; and means for varying the duration of the connection between said condensers and the poles of said apparatus, irrespective of the currents passing over said line or lines from said condensers.

11. The combination of apparatus producing suitably varying currents, electromotive force or potential, and therewith charging the polar condensers; said polar condensers; one or more sectional lines connected to said condensers; and means for varying the number and potential of said charges to regulate the amount of electrical energy sent over said line or lines.

12. In a system or line such as described, the combination of a series of conductors, each arranged to meet the requirements of the service upon it; and condensers inductively uniting the same in series into a single line.

13. In a system or line such as described, the combination of a series of condensers of substantially equal capacities; and section conductors connecting the same in a line, and each section of the line being arranged to suit the requirements of the service upon it.

14. In a line for use as described, the combination of two or more sections arranged in series and having approximately equal resistances; and condensers of approximately equal capacities inductively uniting the contiguous ends of the consecutive sections.

15. In a line for use as described, the combination of two or more sections of approximately equal resistances, arranged in series; and condensers inductively uniting said sections, with capacities at least sufficient for discharging the maximum volume of current wanted in any one section of the line.

16. In a line for use as described, the combination of two or more sections of approximately equal resistance arranged in series, the length and resistance of each section being adapted or adjusted, for conveying the maximum volume of current required to be used in any one section of the line, and condensers inductively uniting said sections, and having capacities adjusted or adapted to discharge said volume of current into and over the sections.

17. In a line for use as described, the combination of two or more sections of approximately equal resistance arranged in series, the section having the highest resistance being adjusted or adapted for conveying the maximum volume of current required in any single section of the line; and condensers inductively uniting the same and adjusted or adapted for inducing and discharging that volume of current over the sections connected to them.

18. In a line for use as described, the combination of two or more sections arranged in series, and adapted for the currents to be used; condensers inductively uniting them into a line and having capacities suitable for said currents; and polar or terminal condensers connected to the ends of the line and having capacities somewhat greater than the line condensers.

19. The combination of apparatus for producing suitably varying currents, electromotive force or potential; one or more suitable lines connected to the poles of said apparatus and consisting of sections united by condensers; and terminal or polar condensers connecting the ends of said lines to the poles of said apparatus, and having capacities greater than the line condensers.

20. The combination of apparatus producing suitably varying currents, electromotive force or potential; one or more lines consisting of sections inductively connected by condensers, and connected to the poles of said apparatus through condensers; and means for adjusting or varying the difference of potential at the poles of said apparatus, to secure the prompt and complete charging of said condensers.

21. The combination of apparatus producing suitably varying currents, electromotive force or potential; one or more lines consisting of sections inductively united by condensers, and connected to the poles of said apparatus through condensers; means for adjusting the difference of potential at the poles of said apparatus; and electrical receivers in said line or lines for utilizing the currents conveyed thereby.

22. The combination of apparatus producing suitably varying currents, electromotive force or potential; means for varying the difference of potential at the poles of said apparatus; a line consisting of sections inductively united by condensers and connected to said apparatus; and electrical receivers in two or more sections of said line.

23. The combination of apparatus producing suitably varying currents, electromotive force or potential; means for adjusting the speed of said apparatus, means for adjusting the difference of potential at the poles of said apparatus; and one or more lines consisting of sections inductively united by condensers, and connected to the poles of said apparatus through condensers.

24. In a line for use as described, the combination of a line condenser made in parts or sections electrically insulated from each other, and arranged to be used separately or cut out of service; branch conductors connected to the several parts; and switches or means for opening and closing the circuit of each branch conductor and coupling them together into the main line as desired.

25. In a line for use as described, the combination of a line condenser, one side or half of which is made in parts or sections electrically insulated from each other, and arranged to be used separately or cut out of circuit; branch conductors connecting the several parts to the line; and switches or means for opening and closing the circuit of each branch conductor and coupling them together into the main line, as desired.

26. In a line for use as described, the combination of a line condenser made in sections or parts electrically insulated from each other; branch conductors connected to said parts; and in the main line, and electrical receivers in said branch or branches.

27. In a line for use as described, the combination of a line condenser; and two or more branch lines connecting said condenser to the main line, and each consisting of sections connected by condensers.

28. In a line for use as described, the combination of a line condenser made in sections or parts electrically insulated from each other; a branch conductor connecting each section or part to the main conductor, and consisting of sections of conductor arranged in series similarly to the main line; and branch condensers inductively connecting said branch sections, and each corresponding in capacity to that section of the line condenser to which said branch is connected.

29. In a system or line such as described, the combination of a line condenser made in sections or parts electrically insulated from each other; an electrical receiver in the main line conductor; and means for coupling or connecting as many of said parts or sections to the main conductor as may be required to make up the proper capacity, for discharging the desired current through said receiver.

30. In a system or line such as described, the combination of two condensers, each made in two or more sections or parts; branch conductors connecting corresponding parts of the two condensers; and an electrical receiver which produces "counter-electromotive force," in one or more of the branch conductors.

31. In a system or line such as described, the combination of two condensers; a conductor connecting them; and an electrical receiver which generates "counter-electromotive force", in said conductor.

32. The combination of two or more line-sections arranged in series; electrical receivers taking currents from said sections;

and condensers connecting said sections of line, and having capacities adjusted or adapted to discharge the proper volume of currents for said receivers.

33. The combination of two or more adjacent sectional lines, or series of line conductors, and a single series of line condensers connecting the corresponding sections of the several lines, the whole constituting virtually a single line with sections consisting of branch or parallel conductors.

34. In a line for use as described, the combination of two line condensers; and branch sectional lines connecting the two condensers.

35. The combination of two adjacent or parallel line sections or conductors between condensers, one of them being broken open at a point between two of the line conductors and a cross-conductor between them, electrically connecting the broken or open end to the adjacent line or section.

36. The combination of two line or section conductors between two condensers; and one or more sectional lines cross-connecting them at points of different potential.

37. In a sectional line, the combination of two condensers; two or more branch conductors connecting the same; and one or more electrical receivers in said branches.

38. In a sectional line, the combination of two condensers; two or more branch conductors connecting the same; and an electrical receiver in one or more of said branches which generates "counter - electromotive force."

39. In a sectional line, the combination of two condensers; two or more branch conductors connecting the same; and electrical receivers and generators of "counter-electromotive force" in two or more of said branches, such as electric motors which in actual use are likely to alternate or differ in the times of greatest use of current by them.

40. In a sectional line, the combination of two condensers; two or more branch conductors connecting the same; and electrical receivers in one or more of said branches, and arranged to collectively use a substantially uniform current.

41. In a sectional line, the combination of two condensers; one or more conductors connecting said condensers; and one or more electrical receivers in the said conductor or conductors; the total resistance between the two condensers being adjusted to not exceed the amount fixed upon for the common resistance of the line sections.

42. In a sectional line, the combination of two condensers; a conductor between said condensers, conveying the line currents, and of low resistance; and one or more electrical receivers inserted therein whose resistance increases the resistance of the section to the standard or common section-resistance.

43. In a sectional line, the combination of two or more sections connected by condensers, and of low electrical resistance; and one or more electrical receivers in each of said sections whose resistance is added to that of the section.

44. In a system such as described, the combination of two sections or conductors conveying line currents between condensers; and a cross-conductor electrically connecting the same.

45. In a system or line such as described, the combination of two sections or conductors conveying line currents between condensers; a cross-conductor connecting them; and an electrical receiver in said cross-conductor.

46. In a system such as described, the combination of two sections or conductors conveying line currents between condensers; and a cross-conductor connecting them at points of different potential.

47. In a system such as described, the combination of two sections or conductors conveying line currents between condensers; a cross-conductor connecting them at points of different potential; and an electrical receiver in said cross-conductor.

48. In a system in which the line is divided into sections connected through condensers, the combination of two sections or conductors connecting the line condensers and conveying currents in the same direction; and a cross-conductor connecting them at points of different potential.

49. In a system in which the line is divided into sections connected through condensers, the combination of two sections or conductors connecting the line condensers and conveying currents in the same direction; one or more cross-conductors connecting them at points of different potential; and electrical receivers in one or more of said cross-conductors.

50. In a system in which the line is divided into sections connected through condensers, the combination of two sections or conductors connecting the line condensers and conveying currents in the same direction; electrical receivers in said conductors; one or more cross-conductors connecting them at points of different potential; and electrical receivers in said cross-conductors.

51. In a system in which the line is divided into sections connected through condensers, the combination of two sections or conductors connecting the line condensers and conveying line currents; a cross-conductor connecting them at points of different potential; and one or more electrical receivers in said cross-conductor; the ratio of the total resistance to the difference of potential between its terminals, in the cross-conductor, not exceeding that in the main conductors.

52. In a system in which the line is divided into sections connected through condensers, the combination of a section or conductor of uniform resistance, conveying line currents between two condensers; a similar section or conductor conveying currents in the same direction, contiguous to the former, but arranged with a fixed difference of potential between the opposite points in the two conductors; and a cross-conductor connecting opposite points in the two section conductors; the whole arranged and operating to secure a constant and uniform difference of potential between the terminals of said cross-conductor at any point along the line or sections so arranged.

53. In a system in which the line is divided into sections connected through condensers, the combination of two adjacent sections or conductors of uniform resistance, conveying currents in the same direction between the condensers; cross-conductors connecting them at points of different potential and parallel with each other; and electrical receivers in the cross-conductors; the whole arranged and operating to secure any desired difference of potential between the terminals of the cross-conductors, which difference is constant, and is uniform at all points along the line or sections so arranged.

54. The combination of two consecutive sections of a sectional line, arranged in line with each other but having an opening between them; a non-conducting strip between them, filling said opening; a condenser; and conductors connecting the contiguous ends of the two sections to the two sides or armatures of the condenser.

55. The combination of two adjacent sectional lines, having the opposite sections of uniform electrical resistance, and arranged with the condensers of each line opposite the center of resistance of the sections in the other line.

56. The combination of two adjacent sectional lines, having the condensers of each line located opposite the center of resistance of the sections in the other; and a cross-conductor electrically connecting the opposite points in the two lines.

57. The combination of two adjacent sectional lines, arranged with the condensers of each line opposite the center of resistance of the sections in the other; and a cross-conductor electrically connecting the opposite points in the two lines, and arranged to be moved along the lines.

58. The combination of two adjacent sectional lines, arranged with the condensers of each line opposite the center of resistance of the sections in the other; and a cross-conductor electrically connecting the two lines, and arranged to be simultaneously moved along both of the lines.

59. The combination of two adjacent sectional lines, arranged with the condensers of each line opposite the center of resistance of the sections in the other; and a cross-conductor electrically connecting the opposite points in the two lines, and arranged to be simultaneously and equally moved along both of the lines.

60. The combination of two adjacent sectional lines or section conductors conveying currents in the same directions, and having the ends of each such section conductor or section arranged opposite the center of resistance in the adjacent conductor or section, and a cross-conductor electrically connecting the opposite points in the two lines or conductors, and arranged to be simultaneously moved along both of them in the same direction.

61. The combination of two sections or section conductors between condensers, of similar size and resistance, properly extended for use, and arranged contiguous or parallel to each other but having a fixed difference of potential between opposite points in them, with a resistance in the alternate ends of said sections or section conductors sufficient to bring the working ends of both opposite each other.

62. The combination of two sections or section conductors between condensers, of similar size and resistance, properly extended for use, and arranged parallel or contiguous, to each other but having a fixed difference of potential between opposite points in them, with a loop line or lines in the alternate ends of said sections or section conductors, containing sufficient resistance to bring the working ends of both sections or section conductors opposite each other.

63. The combination of two conductively discontinuous adjacent sections or conductors; a single source of electrical supply for said conductors; a cross-conductor connecting them at points of different potential; and a terminal at each end of the cross-conductor consisting of a brush or contact-maker electrically connecting the section and cross-conductors.

64. The combination of two consecutive or connecting sections, arranged with an opening between them; a non-conducting strip filling said opening and completing the track or line; and a terminal or contact-maker movable along said track or line, taking current from the sections by contact, and whose extreme points of contact are nearer together than the ends of the non-conducting strip.

65. The combination of two sections of track or line, arranged with an opening between them; a non-conducting strip filling said opening and completing the track or line; a contact-maker movable along said line and taking current from the sections by contact, having a contact-base shorter than the non-conducting strip; and a supplementary contact-maker for making contact with one of the line-sections when the main contact-maker is cut out by the non-conducting strip.

66. In a movable terminal or contact-maker for use as described, the combination of a contact-maker for normally taking current from the sections, having a contact-base shorter than the non-conducting strip in the line; a supplementary contact-maker for making contact with one of the line-sections when the main contact-maker is cut out by the non-conducting strip; and a catch or means for normally preventing the latter from touching the line.

67. In a movable terminal arrangement for use as set forth, the combination of a normal contact-maker arranged as described; a detaining magnet in the main circuit of this contact-maker; a supplementary contact-maker for making contact with the line when the main contact-maker is cut out by the non-conducting strip in the line arranged in a shunt around the detaining magnet, and normally held back by said magnet as long as a current flows therethrough; and a spring or means for pressing it into contact with the line when free from said magnet.

68. In a line consisting of sections connected by condensers, the combination of a coil or conductor in one of the sections, between two condensers; and a second coil or conductor, arranged in reversible inductive relation thereto, such that currents flowing in one conductor or coil produce corresponding currents by induction in the other, and vice versa.

69. The combination of a line consisting of sections connected by condensers; a coil or conductor in one of the sections; a second coil or conductor arranged in inductive relation thereto; and an electrical receiver and generator of current or electromotive force in said second coil.

70. In a line or system such as described, the combination of a coil or conductor in each of two sections conveying currents in opposite directions, and a coil or loop having its sides or parts in similar inductive relation to both; the whole arranged and operating to induce currents in the same direction in the loop, corresponding to those flowing in the line sections, and vice versa.

71. In a line or system such as described, the combination of a conductor in each of two line sections which convey currents in opposite directions; a loop or coil having its sides or parts in similar inductive relation to both sections; and an electrical receiver and generator of current or electromotive force in the circuit of said coil.

72. In a line or system such as described, the combination of two section conductors; a cross-conductor connecting the same at points of different potential; a coil or conductor in said cross-conductor; and a second conductor or coil arranged in inductive relation to the former.

73. In a line or system such as described, the combination of two section conductors; a cross-conductor connecting the same at points of different potential; a coil or conductor in said cross-conductor; a second conductor or coil arranged in inductive relation to the former; and an electrical receiver and generator of currents or electromotive force arranged in the circuit of said second coil.

74. The combination of a line or circuit consisting of sections connected by condensers; an electrical receiver having its parts or coils arranged to be acted upon by the currents passing over two or more different sections of said circuit; and an armature or part influenced by the magnetism so produced in said receiver by the currents flowing over said sections.

75. The combination of a source of electricity producing currents, electromotive force or potential of one polarity and tension; apparatus producing therefrom suitably varying currents, electromotive force or potential; condensers having one-half or armature connected to the poles of said apparatus; and one or more lines having their ends connected to the other sides or armatures of said condensers and consisting of sections connected in series through condensers.

76. The combination of a source of electricity producing currents, electromotive force or potential of one polarity and tension; apparatus producing therefrom suitably varying currents, electromotive force or potential; one or more lines consisting of sections connected by condensers, connected to the poles of said apparatus through condensers; and an electrical receiver having its parts or coils arranged to be acted upon by the currents flowing over two or more different sections of line.

77. The combination of a line consisting of sections connected by condensers; and an electrical receiver having its parts or coils arranged to be acted upon by the currents passing over two or more of the sections.

78. The combination of a sectional circuit or line for repeating inductions over the sections; and a series of coils inserted in two or more of the sections, for utilizing the original induction cumulatively.

79. The combination of a sectional circuit or line; and an electrical receiver and generator of currents, electromotive force or potential having parts or coils arranged to be acted upon by the currents flowing over two or more different sections of the line.

80. The combination of a sectional line or circuit; an electrical receiver and generator of currents, electromotive force or potential, having coils or parts arranged to be acted upon by the currents flowing over two or more different sections of the line; a separate or local circuit containing one or more other coils or parts of said receiver; and an electrical receiver inserted in the local circuit.

81. In a system such as described, the combination of two condensers; two or more branch conductors connecting the same; and electrical receivers and generators of currents, electromotive force or potential inserted in said branch conductors.

82. The combination of a sectional line or circuit; an electrical receiver having a plurality of coils; and connections for including at least two of the coils of said receiver in contiguous sections of the line.

83. The combination of a line consisting of sections connected by condensers; field-magnet coils of an electric generator, motor or analogous device, arranged in one or more sections of the line; and armature or corresponding coils of the same arranged in one or more other sections of the line; the resistances in the serial sections being made approximately equal.

84. In a system in which the line is divided into sections connected through condensers, the combination of apparatus for furnishing suitably varying currents, electromotive force or potential; a sectional line connected to the pole of said apparatus through a condenser; one or more sections of said line arranged as simple conductors of the line currents between the condensers; one or more sections arranged for the insertion of electrical receivers therein for utilizing said currents along said latter sections; and electrical receivers in said latter sections.

85. In a system in which the line consists of sections connected through condensers, the combination of apparatus for furnishing suitably varying currents, electromotive force or potential; a sectional line connected to the pole of said apparatus through a condenser; one or more sections of said line arranged as simple conductors of the line currents; one or more sections arranged for the insertion of electrical receivers to be acted upon by the line currents, whether by induction or conduction; and one or more electrical receivers so arranged in said latter sections and utilizing the line currents cumulatively.

86. The combination of apparatus for furnishing suitably varing currents, electromotive force or potential; a sectional line connected to the said apparatus; and an electrical receiver in said line having its magnetic parts made of iron filings or powder having each particle electrically insulated from the others.

87. The combination of a line consisting of sections connected through condensers; a conductor in said line arranged in one or more coils, helices or loops; with cores and other magnetic parts made of iron filings or powder having each of the particles electrically insulated from the others.

88. In an apparatus for use in a system such as described, the combination of a conductor arranged in one or more coils, helices or loops; cores and other magnetic parts made of iron filings or powder having each of the particles electrically insulated from the others, and an envelop or casing to hold said particles in position.

89. The combination of a line consisting of sections connected through condensers; a conductor in said line arranged in one or more coils, helices or loops; cores and other magnetic parts made of iron filings or powder having each of the particles electrically insulated from the others, and a frame or support to sustain said parts.

90. In a system such as described, the combination of a sectional line or circuit; an electrical receiver; and an induction coil arranged between the line and said electrical receiver.

91. The combination of a sectional line or circuit; a local circuit containing an electrical receiver; and an induction coil, having primary coil or coils in the conductor conveying the line currents and its secondary coil or coils in the local circuit.

92. The combination of a sectional line or circuit; a local circuit containing an electrical receiver and generator of "counter-electromotive force;" and an induction coil having primary coil or coils in the line and secondary coil or coils in the local circuit.

93. In a system such as described, the combination of apparatus furnishing suitably varying currents or electromotive force of high potential; a sectional line conveying varying currents therefrom; a local circuit; and an induction coil having primary coil or coils acted upon by the line currents; and secondary coil or coils in the local circuit; the whole arranged and operating to produce in the local circuit currents corresponding to the line currents, with or without change in the potential and quantity or volume of the same.

94. In a system in which the line is divided into sections connected through condensers, the combination of two conductors conveying line currents between condensers; a cross-conductor connecting them at points of different potential; a local circuit containing an electrical receiver; and an induction coil having primary coil or coils acted upon by the line currents, and secondary coil or coils in the local circuit.

95. In a system in which the line is divided into sections connected through condensers, the combination of two conductors conveying line currents between condensers; a cross-conductor connecting them at points of different potential; a local circuit containing an electrical receiver and generator of "counter-electromotive force"; and an induction coil having primary coil or coils acted upon by the line currents, and secondary coil or coils in the local circuit.

96. In a system such as described, the combination of a section or conductor conveying line currents; an induction coil having primary coil or coils acted upon by said currents; and one or more sectional lines connected to the secondary coil or coils of said induction coil.

97. In a system such as described, the combination of a section or conductor conveying line currents; an induction coil having primary coil or coils acted upon by said currents; and two or more lines connected to the secondary coil or coils of said induction coil.

98. In a system such as described, the combination of a sectional line; a pole-changing apparatus actuated by the currents flowing over said line, and sending them in one direction through a local circuit connected thereto; and a local circuit connected thereto and containing one or more electrical receivers for utilizing said "adjusted" currents.

99. In a system such as described, the combination of a sectional line; a revolving pole-changing apparatus actuated by the currents flowing over said line, and directing said currents in one direction through a local circuit connected thereto; and a local circuit connected thereto and containing one or more electrical receivers for utilizing said "adjusted" currents.

100. In a system such as described, the combination of a sectional line; a pole-changing apparatus actuated by the currents flowing over the line and whose speed is governed by them, arranged to send alternating impulses in one direction through a local circuit connected thereto; and a local circuit connected to said apparatus, containing one or more electrical receivers.

101. In a system such as described, the combination of apparatus producing suitably varying currents, electromotive force or potential; a second and similar apparatus, governed by the former and caused to operate synchronously therewith; and a suitable line extending between the opposite poles of the two apparatus, and having its ends connected to said poles through condensers.

102. In a system such as described, the combination of apparatus producing suitably varying currents, electromotive force or potential; a second and similar apparatus, governed by the former and caused to operate synchronously and similarly therewith; and a suitable line extending between the opposite poles of the two apparatus, and having its ends connected to said poles through condensers.

103. In a system such as described, the combination of apparatus producing suitably varying currents, electromotive force or potential; a similar apparatus, governed by the former, and caused to operate synchronously therewith; a suitable line extending between the opposite poles of the two apparatus, and having its ends connected to said poles through condensers; and reversing apparatus for reversing the action, to operate and control the system from either end of the line.

104. In a system such as described, the combination of a sectional line; a pole-changing apparatus actuated and governed by the currents flowing over the line; a local circuit connected thereto; and a generator of currents, electromotive force or potential in said circuit; the whole arranged and operating to throw electrical impulses or currents from the local circuit into the main line in the same direction and simultaneously with those flowing over the line.

105. In a system such as described, the combination of a sectional line; field-magnets of a current-generating apparatus governed by the currents or impulses flowing over the line; and the poles of said generator connected to the line; the whole arranged and operating to throw electrical impulses or currents from said generator into the main line in the same direction and simultaneously with those flowing over the line.

106. In a system such as described, the combination of a sectional line; a pole-changing apparatus governed by the currents flowing over the line; a local circuit connected thereto; a generator of currents, electromotive force or potential in said circuit; and a second sectional line connected to the pole-changing apparatus and local circuit; the whole arranged and operating to send over the second sectional line currents or impulses corresponding to those flowing over the former.

107. In a system such as described, the combination of a sectional line; a generator of currents, electromotive force or potential, governed by the currents flowing over the line, and a second sectional line connected thereto; the whole arranged and operating to send over the said second line currents or impulses corresponding to those flowing over the former.

108. In a system such as described, the combination of a sectional line; and a generator of currents, electromotive force or potential arranged in said line and governed by the currents flowing over it; the whole arranged and operating to connect the said generator in the line in series with the prime generator in supplying currents for the line.

109. In a system such as described, the combination of two adjacent sectional lines, arranged with the condensers of each line opposite to the center of resistance of the sections in the other, and conveying currents in the same directions; a second pair of lines similarly arranged, in convenient proximity to the former; a non-conducting strip between the corresponding lines of each pair, filling the openings between them and completing two lines or tracks; a cross-conductor connecting the opposite points of the two lines, and movable along the track from one pair of lines onto the other; and one or more electrical receivers in said cross-conductor.

110. In a system such as described, the combination of two adjacent sectional lines conveying suitably varying currents; a second pair of sectional lines arranged in convenient proximity to the former, and conveying currents having different periods, strengths or characters; two non-conducting strips between the corresponding lines of the two pairs, filling the openings between them and completing two lines or tracks; a cross-conductor connecting the two lines of a pair and movable along the lines from one pair onto the other; and one or more electrical receivers in said cross-conductor which are fitted to receive and utilize the currents flowing over each of said pairs of lines.

111. An organized system for the production, transmission and distribution of electricity, consisting of the combination, substantially as hereinbefore set forth, of apparatus producing suitably varying currents, electromotive force or potential; regulating, adjusting and controlling devices, governing and varying the actions and operations of said apparatus and the nature of the currents or inductions produced and caused thereby; similar apparatus and devices, governed by the former, and arranged to operate synchronously and similarly therewith; one or more suitable lines extending between the opposite poles of the said apparatus, and having their ends connected to the said poles through condensers; reversing apparatus for reversing the action, to operate and control the system from either of said current-producing apparatus; one or more branch or extension lines, properly connected with the master line or lines; movable connections, arranged to take currents from any of said line or lines, and to move from one line onto another, with suitable electrical receivers to utilize said currents; current generating apparatus arranged in any of said lines to relay the currents thereon; current generating apparatus in any of said lines, governed by the currents thereon, and sending currents through one or more independent or local circuits or lines, with their electrical receivers; one or more sections having suitable electrical receivers inserted therein; one or more sections having suitable electrical receivers arranged in inductive relation thereto; one or more sections consisting of branch sectional lines connecting the section-condensers; one or more sections containing electrical receivers utilizing currents cumulatively; one or more sections containing electrical receivers and generators of "counter-electromotive force"; one or more sections arranged simply for conveying the line currents but without utilizing them in electrical receivers thereon; one or more sections suitably arranged for utilizing the currents in electric receivers; suitable condensers for connecting the various sections and conductors; one or more sections or conductors containing primary coil or coils of an induction coil, whose secondary coil or coils are in one or more independent lines or circuits with their electrical receivers; cross-conductors connecting the sections or conductors in any of the aforesaid lines or circuits; the whole arranged and operating to transmit and utilize the energy expended at the generator by means of repeated inductions in the several condensers and sections.

112. The combination with apparatus producing suitably varying currents, electromotive force or potential, of a sectional line connected to said apparatus; one or more coils, helices or loops in said line; a quantity of small particles or pieces of soft iron; a non-conducting coating or sheath around and between the particles, electrically insulating them from each other; and means for holding the mass in the desired shape, for cores and other magnetic parts used with said coils or helices.

113. In a system such as described, the combination of apparatus producing suitably varying currents, electromotive force or potential; a similar apparatus, governed by the former, and caused to operate synchronously therewith; a suitable line extending between the opposite poles of the two apparatus, and having its ends connected to said poles through condensers; and reversing apparatus connected with the second generating apparatus, and governed by the presence or stoppage of the normal currents on the line, for automatically reversing the action of the second generating apparatus and making it an independent or prime generator of suitably varying currents for the line.

114. The combination of a line consisting of sections connected through condensers, and electrical receivers inserted in two or more of the sections, and having no connection to earth.

115. In a system such as described, the combination of a series of line-sections, adjusted as to their common resistance, relatively to the difference of potential in the line condensers, to cause the proper volume of current to flow over them; condensers connecting them into a line, and adjusted as to their line-capacities, to furnish said volume of current; and current generating and varying apparatus, adjusted as to its rate of variation and the potentials at its poles, to secure the required difference of potential in the line condensers.

116. In a line such as described, the combination of a series of condensers; line sections inductively connected through them into a line; and resistances in said sections, adjusted to a common standard, such that the section containing the highest resistance shall permit the desired current to flow over that section and consequently over the line.

117. The combination of two line or section conductors between condensers, of similar size and resistance, properly extended for use, arranged parallel or contiguous to each other but having a fixed difference of potential between them, and a resistance in the alternate ends of each, sufficient to bring their working ends opposite to each other and secure the desired difference of potential between them.

118. The combination of two or more line sections, of suitable resistances; suitable condensers connecting and terminating said series of sections; apparatus for furnishing suitably varying currents, electromotive force or potential, having its charging coils or parts in said line sections, charging said condensers in series, and giving to the terminal condensers the cumulated difference of potential produced in the whole series; and a line consisting of similar sections and condensers connected in series to the terminal condensers, for transmitting over it currents corresponding to the varying potentials in the said condensers.

119. In a sectional line, the combination of two conductors connecting two or more condensers in series in said line, one of said condensers inductively connecting said conductors through it; and inductive plates in said condenser of unequal capacities on its two sides or halves.

120. In a sectional line, the combination of two conductors connecting two or more condensers in series, one condenser inductively connecting them through it; inductive plates in said condenser having a certain size and capacity; means for giving said plates a static charge of a certain potential; opposing inductive plates in said condenser having their size or capacity so adjusted relatively to the other plates as to secure the desired potential in the induced charge of said plates; and means for properly reversing, interrupting, or otherwise varying the currents produced by the charging apparatus, whereby a continuous alternating current having the desired potential is sent out by said opposing plates over the conductor or section connected to them to the other condenser.

121. In a sectional line, the combination of two condensers connected in series in said line having their sides or halves arranged to secure unequal working sizes or capacities; and a suitable conductor or section connecting in series the sides which have approximately equal capacities.

122. In a sectional line, the combination of two condensers connected in series in said line, each having one side of the normal line capacity and the other side arranged to secure a different or special capacity, and a suitable conductor or section connecting in series the sides having the special capacities.

123. The combination of apparatus for producing suitably varying current, electromotive force or potential; one or more sectional lines connected to the pole or poles of said apparatus; and an automatic circuit closer in one or more of the sections for practically maintaining the continuity of the sections containing them, substantially as set forth.

124. The combination of apparatus for producing suitably varying current, electromotive force or potential; a sectional line connected to the pole of said apparatus; a section in said line divided into two or more branch or derived circuits between the condensers, and automatic apparatus therein for practically maintaining the electrical continuity of the circuit by automatically restoring it when broken.

125. In a sectional line such as described, the combination of two condensers arranged in series, and two or more section lines between said condensers electrically connecting them in series.

126. In a section line such as described, two line-condensers connected in series, and a plurality of derived circuits connecting said condensers.

127. The combination of two or more derived circuits between two condensers; suitable resistance in their alternate ends producing any desired difference of potential between opposite points in adjacent circuits; and cross-conductors connecting any two such opposite points and securing at their terminals the difference of potential existing between the points so connected.

128. In a line such as described, the combination of two condensers in series; a conductor connecting said condensers; and an automatic circuit closer for automatically restoring the continuity of the circuit where broken.

129. The combination of a sectional line such as described, and means inserted in a section of said line for automatically restoring or completing the continuity of the metallic portions of the circuit where broken or opened, substantially as set forth.

130. The combination of a line; a coil or conductor in said line; a second coil or conductor in inductive relation to the first and movable along said line; and a sectional line having two or more condensers connected in series in circuit with said second coil or conductor.

131. The combination of a sectional line consisting of two or more condensers connected in series by the line or section conductors, and conveying an uninterrupted alternating current over it, and an electrical receiver adapted to be actuated by induction therefrom in the same manner on each side of the successive condensers in said line.

132. The combination of a sectional line energized by suitably varying current, an electrical circuit arranged in proximity to said line and adapted to be influenced by induction from the different currents on the successive sections of said line, and an electrical receiver actuated by said currents thus produced.

133. The combination of a sectional line energized by a suitably varying current, a circuit arranged as a cross-connection and in inductive relation to successive sections of said line, and an electrical receiver actuated by currents thus induced.

134. The combination of a generator of suitably varying current, E. M. F. or potential, a line for said current consisting of discontinuous sections inductively connected in series by condensers or equivalent apparatus; a circuit including a coil or other device arranged in inductive relation to said line and adapted to have currents induced therein by proximity to the successive sections of said line; and an electrical receiver adapted to be actuated by currents so produced in said coil or device.

135. The combination of a generator of suitably varying currents, E. M. F., or potential; two working lines (one of them being a sectional line having two or more condensers in a series) having their ends connected to the poles of the generator and their other ends permanently grounded; and an earth connection between said grounds, completing the circuit between the two poles of said generator over the two lines in a single series whereby said varying current E. M. F. or potential is transmitted without change from one pole to the other through the two lines in a single series.

136. The combination of a generator of suitably varying currents, E. M. F., or potential; two working lines (one of them being a sectional line having two or more condensers in a series) having their ends connected to the poles of the generator and their other ends grounded; and an earth connection between said grounds, completing the circuit between the two poles of said generator in a single series out on one line and return on the other over said two lines; and electrical receivers for utilizing said current, in any or all parts of said completed circuit.

137. The combination of a generator of suitably varying current, E. M. F., or potential; two sectional lines having their ends connected to the poles of said generator and their other ends grounded; and an earth connection between said grounds conducting the currents or impulses unchanged from one line to the other, and completing the line between the poles.

138. The combination of a generator of suitably varying current E. M. F. or potential; two sectional lines having their ends connected to the poles of said generator and their other ends grounded; and an earth connection between said grounds conducting the currents or impulses unchanged from one line to the other and completing the line between the poles; and electrical receivers for utilizing said current in any or all of the sections of said completed line.

139. The combination of a generator of suitably varying current, E. M. F. or potential; two sectional lines having their ends connected to the poles of said generator and their other ends grounded; and an earth connection between said grounds conducting the currents or impulses unchanged from one line to the other; the total resistance between the two condensers including the grounds being such as to admit of the circuit between said condensers serving as one section of said completed line.

140. The combination of a generator of suitably varying current, E. M. F. or potential, having one pole connected to earth; a sectional line such as described including two or more condensers connected in a series having one end connected to one pole of said generator and the other end grounded; and apparatus for light, heat or power in one or more sections of said line and without any ground wire or connection to earth, and sending no current to earth but on over the line, connecting said apparatus,—the said line sections with their condensers and apparatus being all arranged in a single series.

141. In the hereindescribed system, a device for producing and transmitting uninterrupted currents through condensers, consisting in the combination of means for generating current waves or alternations in which the potential both rises and falls at the same rate; means for therewith charging and discharging the line condensers and sending the desired currents over the line; two or more line condensers having suitable capacities arranged in series between the generator pole and the earth; and line sections having such resistances as will permit the desired currents to flow over the line, connecting said condensers in a single series, and forming a sectional line.

142. The combination of generating apparatus producing current or E. M. F. in which the potential rises and falls in equal ratios or rates; a sectional line connected to one pole of said apparatus, and consisting of two or more condensers connected in a single series by lines, or sections of suitable resistance; and means for inducing alternate static charges and discharges in said condensers, from the generator, with sufficient rapidity to keep a continuous alternating current flowing over said sectional line.

143. The combination of a sectional line such as described, and electrical receivers in said line adapted to operate without being connected to earth.

144. In the hereinbefore described system, a sectional line such as described, having no branch or derived circuits between the line and the earth and consisting of the combination of a generator supplying suitably varying current, electromotive force or potential, having sufficient E. M. F. and quantity for the requirements of the line; line sections in such number as will give the quantity of current required in the individual sections, and the minimum of inductive resistances in them; line condensers inductively connecting the sections and having such electrostatic capacities as will secure the required potential and volume of current on the line; and section resistances such as will allow the required current to flow through them.

145. A sectional line such as described, consisting of individual sections practically or sufficiently free from inductive resistances, and two or more suitable condensers connecting them into a series line between the generator pole and the earth, or between one pole and the other.

146. In the within described system, a device for increasing the useful or utilized energy or work of the current transmitted by a series of condensers, consisting of the combination of condensers arranged in series or cascade; suitable working lines or sections inductively connected in series by the condensers and forming a sectional line; and suitable electrical receivers arranged in, or in inductive relation to, said sections; whereby the energy of the current flowing over the line may be utilized in each of the sections and between all of the several condensers in the series, instead of utilizing them only at the ends of the series, as has been done previous to my invention.

147. The combination of generating apparatus automatically producing current waves or alternations in which the potential both rises and falls in approximately the same ratio; two or more condensers charged thereby, arranged in series and connected into a sectional line such as described, by sections or working lines between them; and electrical receivers actuated by the currents flowing over said sections without opening the circuit and without being connected to earth.

148. The combination of a sectional condenser consisting of insulated condensers or sections of a condenser arranged in multiple; studs connected to the line conductor or conductors running to that condenser; separate switches or cut-outs for the several sections; and suitable connections from the other side of said condenser to the line conductor or conductors; whereby each section can be independently connected to or disconnected from the line.

149. The combination of two or more condensers or sections of a condenser in multiple; two or more lines or derived circuits connected to said condensers; a condenser connected to the other end of said lines; and suitable connections between said lines and condensers, for connecting the same in any way desired.

150. In a system such as described, the combination of two or more sections inductively connected in series by condensers; coils in said sections energized by the currents over them; and a magnetic core in said coils; the whole arranged and operating to magnetize said core with a current whose voltage is equal to the combined differences of potential between the terminals of said coils.

151. In a system such as described, the combination of two or more sections inductively connected in series by condensers; coils in said sections; a magnetic core common to said coils; and means for magnetizing said core as desired; whereby the voltage of the currents induced through said coils is equal to the combined differences of potential between the terminals of all of said coils.

152. In the within described system, a device for transforming the currents flowing over a sectional line or circuit, consisting of the combination of a coil or other inductive device having its primary wire or coil in, or in inductive relation to, said line or circuit; two or more secondary wires or coils; and means for variously connecting the terminals of said secondaries; said secondaries being connected in series to increase the voltage of the current delivered by them, or in multiple arc to increase the volume of the current, as may be desired.

153. The combination of a line consisting of short sections or conductors arranged in series, but not electrically continuous; a coil or other device movable along said line and arranged for the induction of currents or magnetism therein by proximity to said line; and an electrical receiver to be actuated by said currents or magnetism.

154. A line or section conductor connecting two condensers; an electrical receiver which generates counter electromotive force; and a shunt to said conductor, to contain said electrical receiver and prevent it from deranging the potentials at the condensers.

155. In a sectional line, a section between two condensers; a conductor in said section; and regulating and safety apparatus in said conductor.

156. A sectional line; a conductor or shunt in said line; and automatic regulating and safety apparatus actuated by the currents in said conductor or shunt.

157. The combination of a sectional line, consisting of two or more condensers connected in series by the line or section conductors, and energized by a uniformly alternating current over the whole length of it, and an electrical receiver actuated by induction from said line current.

158. The combination of an electric generator supplying a uniformly alternating power current to the line as needed by the electrical receivers along said line; a sectional line consisting of two or more condensers connected in series by the line or section conductors, connected to said generator; and an electrical receiver actuated by induction from said line current.

159. The combination of apparatus for supplying a suitably varying current and transmitting it over a complete circuit or line; two parallel leads or conductors, one being the outgoing and the other the return conductors; an inductive cross connection related to said duplicate line, with its opposite sides in inductive proximity to said opposite conductors, and arranged to have current or magnetism induced therein by such proximity, simultaneously from both conductors in the same direction through the coil; and an electrical receiver arranged to be actuated by the current so induced in said coil or device.

160. The combination of the outgoing and the return leads or conductors of an electrical line or system for conveying a suitably varying current; a coil or inductive device related to said line and having its opposite sides or halves in inductive proximity to the said opposite conductors, and arranged to be simultaneously acted upon in opposite directions by the currents in said opposite conductors, for the production of current in said coil by induction from said conductors; and an electrical receiver arranged to be actuated by the current so induced in said coil.

161. A line conveying suitably varying currents, in combination with an inductive cross connection or coil related to said line, substantially parallel therewith, and arranged to have currents induced therein by its proximity to said line.

162. The combination of a line conveying suitably varying currents; a coil or inductive device related to said line in inductive proximity thereto; and an electrical receiver actuated by the currents so induced in said coil or device.

163. In a current transmitting system, the combination of the outgoing line conductor and the return line conductor, arranged approximately parallel, and each conveying the line current in a direction opposite to that in the other, and a coil or inductive device related to said line, having its opposite sides or halves in inductive relation to both of said opposite line conductors, and exposed to induction on both of its sides at the same time, but by currents of opposite polarities on the opposite sides, whereby the currents so induced therein all have the same direction in the coil.

164. In a system such as described, a device for supplying current or power from a line to an electrical receiver, in relation to the line, but without electrical connection therewith, consisting of the combination of a line conductor arranged in two approximately parallel portions which convey the current in opposite directions at the same time; means for sending an alternating or other suitably varying current over said double line; a coil or other inductive apparatus arranged with its opposite sides or parts in similar inductive relation to said opposite parallel line conductors; said opposite line conductors, with their currents, arranged to both induce currents in the same direction around said coil; and an electrical receiver arranged to be actuated by the currents of said coil or other inductive device.

165. The combination of apparatus supplying suitably varying currents; an electric line or circuit for said current, which is normally in closed circuit while in operation; two sections or portions of the line circuit or conductor arranged substantially parallel and close together, each conveying the line current in the opposite direction to that in the other; and a coil or other inductive device related to said double line, in similar inductive proximity to both of said opposite line conductors, and arranged to have current induced therein in the same direction by both of said conductors.

166. The combination of apparatus supplying suitably varying current; an electric line or circuit for said current, which is normally in closed circuit while in operation; two sections or portions of the line circuit or conductor arranged substantially parallel and close together, each conveying the line current in the opposite direction to that in the other; a coil or other inductive device related to said double line, in similar inductive proximity to both of said line conductors, and arranged to have current induced therein in the same direction by both of said conductors; and an electrical receiver actuated by the currents of said coil.

167. A sectional line consisting of the combination of sections which individually are practically free from inductive resistances, such as self induction, static charge, and the like; and suitable condensers inductively connecting said sections in a single series, as a line without any derived or branch circuits between the line and the earth.

168. A sectional line consisting of the combination of sections which individually are practically free from inductive resistances, such as self induction, static charge, and the like; suitable condensers inductively connecting said sections in a single series, into a line; and an electrical receiver in one or more of the sections without any derived or branch circuits between the line and the earth.

169. The combination of a generator producing suitably varying current, electromotive force or potential; a line consisting of two or more sections which individually are practically free from inductive resistances; and suitable condensers or equivalent devices inductively connecting said sections into a line without any branch circuits to earth.

170. A line consisting of the combination of sections practically free from inductive resistances in the conductor itself, such as self induction, static charge, and the like; condensers or equivalent devices inductively connecting said sections into a line without any branch circuits to earth; and total resistances in said sections approximately equal and small enough in each section to allow the desired line current to flow through it.

171. In the within described system, a device for transmitting electric currents, impulses or waves from a line to an electrical receiver, and vice versa, without any electrical connection between them, consisting of the combination of a generator producing suitably varying current, electromotive force or potential; a suitable line (without any derived ground circuits) conducting the same; and a suitable electrical receiver, arranged in inductive relation to said line, and adapted to be actuated by the currents induced in it by the currents on said line, and vice versa.

172. A sectional line (without any branch or derived circuits between it and the earth) consisting of the combination of two or more sections of wire or conductor practically free from inductive resistances; two parts or portions of said conductor arranged adjacent to each other, and approximately parallel; suitable condensers inductively connecting said sections into a line; and means for sending the line current through the opposite parts in opposite directions at the same time.

173. The combination of a line (without any branch or derived circuits between it and the earth) for railroad and other power uses, consisting of two wires or conductors arranged adjacent to each other and approximately parallel; and means for sending suitably varying current, electromotive force or potential over said opposite conductors in opposite directions at the same time.

174. The combination of a line consisting of two wires or conductors arranged adjacent to each other and approximately parallel; means for sending suitably varying current, electromotive force or potential over said opposite conductors in opposite directions at the same time; and an electrical receiver arranged in inductive relation to both of said conductors, and receiving current from both in the same direction therein, by induction instead of conduction.

175. The combination of two condensers connected in series in a sectional line, the two sides of each condenser having different electrostatic capacities; and one or more sections or conductors between them connecting the two sides which have approximately equal capacities.

176. In a system such as described, the combination of a line or conductor having two parts or sections arranged adjacent to each other and approximately parallel; means for sending a suitably varying current over the two parallel parts in opposite directions at the same time; and a coil or conductor arranged in inductive relation to both of said parallel conductors, and in such manner that said opposite conductors both produce current in the same direction in said coil or conductor.

177. The combination of a generator supplying suitably varying current; a conductor divided into sections; condensers inductively connecting them in series into a line; and electrical receivers inserted in (or in inductive relation to) the line sections; but with no branch or derived circuits between the line and the earth.

178. The combination of a generator supplying suitably varying currents; a conductor divided into sections; condensers inductively connecting them in series into a line; and electrical receivers inserted in (or in inductive relation to) the line sections; but with no branch or derived circuits between the line and the earth, nor any shunts around the line condensers.

179. An inductive cross connection, consisting of a loop or coil disposed between the two conductors of a double line, or having its opposite sides in similar inductive relation to both conductors, and arranged to have currents corresponding to the line currents induced in the coil and in the same direction by both conductors.

180. An inductive cross connection, consisting of a loop or coil disposed between the two conductors of a double line, or having its opposite sides in similar inductive relation to both conductors, and arranged to have currents corresponding to the line currents induced in the coil and in the same direction by both conductors; and an electrical receiver actuated by the currents so induced in the cross connection.

181. The combination of two line conductors, adjacent and approximately parallel; but arranged to convey the line currents in opposite directions; an inductive cross connection consisting of a loop or coil disposed between the two line conductors, or having its opposite sides in similar inductive relation to both conductors, and arranged to have currents corresponding to the line currents induced in the coil and in the same direction by both conductors; and an electrical receiver actuated by the currents so induced in the coil.

182. The combination of two parallel line conductors conveying the line currents in opposite directions; and an inductive cross connection, consisting of a coil or loop having two of its sides in inductive proximity to said double line or line conductors; whereby both conductors induce currents in the same direction in the coil.

183. The combination of a double line, and an inductive cross connection having two of its sides in similar inductive proximity to the two line conductors of said line.

184. The combination of a double line; an inductive cross connection having two of its sides in similar inductive proximity to the two line conductors of said line; and an electrical receiver in, or in inductive relation to, said cross connection.

185. The combination of a double line, and an inductive receiver arranged to be inductively acted upon in the same sense by both line conductors.

186. In a system of electrical distribution, the combination with a transmission line and an alternating current generator arranged to supply alternating current thereto, of a branch line, and an auxiliary generator energized by current from said transmission line and rotating at such speed as to generate straight currents in said branch line connected thereto.

187. In a system of electrical distribution, the combination with a transmission line and a main generator for supplying alternating current thereto, of an auxiliary generator associated with said line at a point distant from the main generator and constructed and arranged to supply alternating current to the line at the same frequency as the current of the main generator to supplement the current of the main generator.

188. In a system of electrical distribution, the combination with a transmission line and a main generator for supplying alternating current thereto, of an auxiliary generator associated with said line at a point distant from the main generator and energized by alternating current from the line, said auxiliary generator being driven at a speed to generate current of the same frequency as that in the line and connected to supply said current to the line.

189. In a system of electrical distribution, the combination with a transmission line and a main generator for supplying alternating current thereto, of an auxiliary generator associated through the medium of a transformer with said line at a point distant from the main generator and constructed and arranged to supply alternating current to said line to supplement the current of the main generator.

190. In a system of electrical distribution, the combination with a transmission line and a main generator for supplying alternating current thereto, of an auxiliary generator having its field magnets energized from the line and its armature connected to supply a supplemental alternating current to the line, and a transformer interposed in the circuit between said armature and line.

191. In a system of electrical distribution, the combination with a transmission line and a main generator for supplying alternating current thereto, of an auxiliary generator having its field magnets energized from the line and its armature connected to the line at a point distant from the main generator and of less potential to supply a supplemental current to the line, and a transformer interposed in the circuit between the armature and line.

192. In a system of electrical distribution, the combination with a transmission line and a main generator for supplying alternating current thereto, of an auxiliary generator having its field magnets energized from the line and its armature provided with a commutator, and a local circuit supplied from said commutator with unidirectional current when said armature is revolved at a given speed and with alternating current when said armature is revolved at any other speed.

193. A magnetic core for electrical apparatus built up of smaller parts or divisions of iron insulated from each other by coating of magnetic oxid of iron formed thereon.

194. A magnetic core for electrical apparatus built up of comminuted iron particles insulated from each other by coating of magnetic oxid of iron formed thereon.

195. A magnetic core for electrical apparatus built up of smaller parts or divsions of iron insulated from each other by highly tenacious and impervious coating of magnetic oxid of iron artificially produced thereon.

196. A dynamo-electric machine or motor comprising a fixed and a movable element, the magnetic core of at least one of said elements being composed of smaller parts or divisions of iron insulated from each other by highly tenacious and impervious coating of magnetic oxid of iron artificially produced thereon.

197. In a dynamo-electric machine or motor, an armature having a core composed of smaller parts or divisions of black iron, the oxid or black coating on the surface of said parts or divisions serving to insulate them more or less from each other.

198. The method of making magnetic cores which consists in artificially converting surfaces of smaller parts or divisions of iron into highly tenacious and impervious coating of magnetic oxid of iron to form insulation, and constructing a core of said parts or divisions.

199. The method of making magnetic cores which consists in artificially producing a surface coating upon iron used for smaller parts or divisions by converting surface iron into a highly tenacious and impervious skin of magnetic oxid of iron to form insulation, and constructing the core of said parts or divisions.

CHARLES E. FRITTS.

In presence of—
T. B. FARNSWORTH,
D. L. HALBROOK.